(12) United States Patent
Nishi et al.

(10) Patent No.: US 11,741,717 B2
(45) Date of Patent: Aug. 29, 2023

(54) DATA GENERATOR AND DATA GENERATING METHOD

(71) Applicant: Panasonic Intellectual Property Corporation of America, Torrance, CA (US)

(72) Inventors: Takahiro Nishi, Nara (JP); Tadamasa Toma, Osaka (JP); Toshiyasu Sugio, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 307 days.

(21) Appl. No.: 17/126,919

(22) Filed: Dec. 18, 2020

(65) Prior Publication Data
US 2021/0104092 A1  Apr. 8, 2021

Related U.S. Application Data

(63) Continuation of application No. PCT/JP2019/025730, filed on Jun. 27, 2019.
(Continued)

(51) Int. Cl.
| | |
|---|---|
| G06V 20/56 | (2022.01) |
| G06T 7/70 | (2017.01) |
| G06T 15/20 | (2011.01) |
| G06V 20/64 | (2022.01) |
| G06V 10/46 | (2022.01) |

(52) U.S. Cl.
CPC ............ G06V 20/56 (2022.01); G06T 7/70 (2017.01); G06T 15/20 (2013.01); G06V 10/462 (2022.01); G06V 20/647 (2022.01); *G06T 2207/30252* (2013.01)

(58) Field of Classification Search
None
See application file for complete search history.

(56) References Cited

U.S. PATENT DOCUMENTS

| | | | |
|---|---|---|---|
| 9,251,410 B1 * | 2/2016 | Lin | ................... G06V 20/52 |
| 2015/0217692 A1 | 8/2015 | Yanagawa | |

(Continued)

FOREIGN PATENT DOCUMENTS

| | | |
|---|---|---|
| JP | 2014-89513 | 5/2014 |
| WO | 2013/111491 | 8/2013 |
| WO | 2016/143113 | 9/2016 |

OTHER PUBLICATIONS

International Search Report (ISR) dated Sep. 17, 2019 in International (PCT) Application No. PCT/JP2019/025730.

*Primary Examiner* — Frank S Chen
(74) *Attorney, Agent, or Firm* — Wenderoth, Lind & Ponack, L.L.P.

(57) ABSTRACT

A data generator which achieves further improvement includes circuitry and memory connected to the circuitry. The circuitry, in operation: obtains sensing data from each of a plurality of moving bodies that includes a plurality of sensors, the sensing data being configured based on results of sensing by the plurality of sensors; and generates synthesized data by mapping the sensing data of the moving body into a virtual space, and when generating the synthesized data, determines a position of the sensing data to be mapped into the virtual space, based at least on a position of the moving body in a real space corresponding to the sensing data.

11 Claims, 14 Drawing Sheets

Related U.S. Application Data

(60) Provisional application No. 62/691,312, filed on Jun. 28, 2018.

(56) References Cited

U.S. PATENT DOCUMENTS

| | | |
|---|---|---|
| 2018/0025634 A1 | 1/2018 | Ujiie et al. |
| 2018/0132340 A1* | 5/2018 | Correa ................. F21S 41/645 |
| 2018/0260103 A1* | 9/2018 | Murad ................ G06F 3/04842 |
| 2019/0052842 A1* | 2/2019 | Du ........................... H04N 7/18 |

* cited by examiner

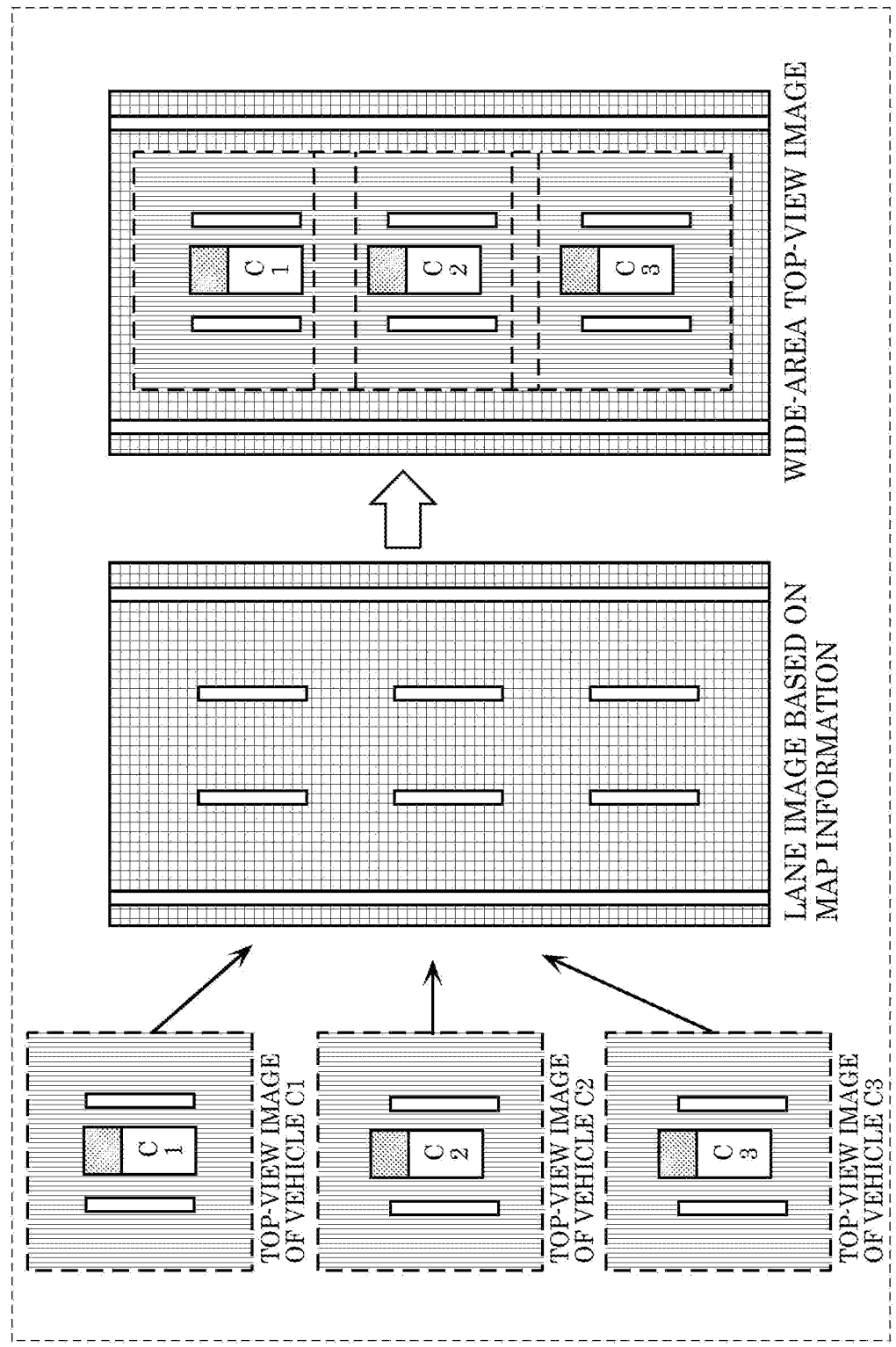

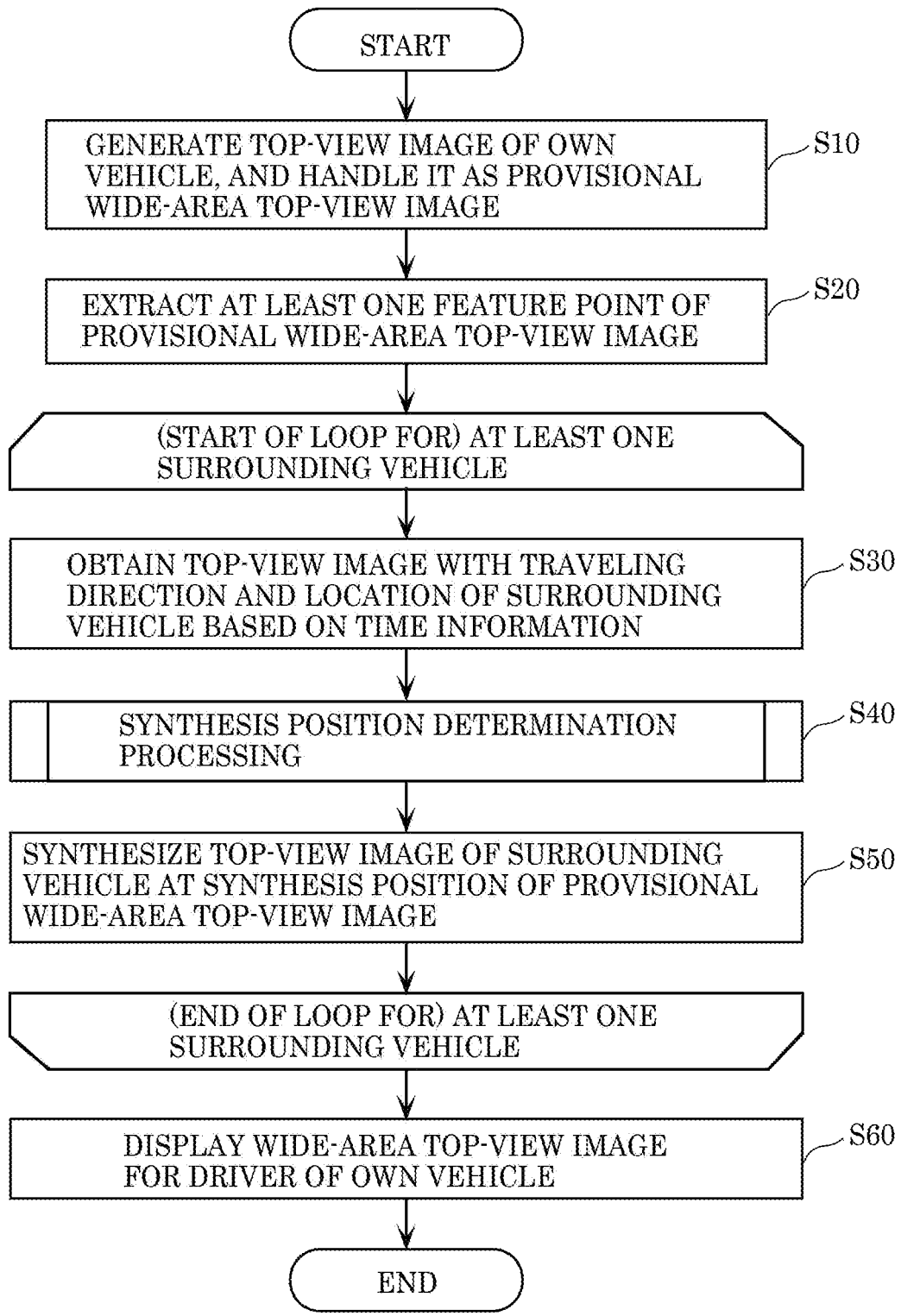

DATA GENERATOR AND DATA GENERATING METHOD

CROSS REFERENCE TO RELATED APPLICATIONS

This application is a U.S. continuation application of PCT International Patent Application Number PCT/JP2019/025730 filed on Jun. 27, 2019, claiming the benefit of priority of U.S. Provisional Patent Application No. 62/691,312 filed on Jun. 28, 2018, the entire contents of which are hereby incorporated by reference.

BACKGROUND

1. Technical Field

The present disclosure relates to a data generator and a data generating method.

2. Description of the Related Art

Conventionally, data generators (which are image generators) for generating top-view images from a plurality of captured images have been proposed (for example, see Japanese Unexamined Patent Publication Number 2014-89513). Such a top-view image is an image of a surrounding area of a vehicle when seen from above the vehicle. The top-view image is used to help parking, for instance.

SUMMARY

Further improvement has been desired for such data generators.

In view of this, the present disclosure provides a data generator for achieving further improvement.

A data generator according to an aspect of the present disclosure includes circuitry and memory connected to the circuitry. The circuitry, in operation: obtains sensing data from each of a plurality of moving bodies that includes a plurality of sensors, the sensing data being configured based on results of sensing by the plurality of sensors; and generates synthesized data by mapping the sensing data of the moving body into a virtual space, and when generating the synthesized data, determines a position of the sensing data to be mapped into the virtual space, based at least on a position of the moving body in a real space corresponding to the sensing data.

These general and specific aspects may be implemented using a system, a method, an integrated circuit, a computer program, or a computer-readable recording medium such as a CD-ROM, or any combination of systems, methods, integrated circuits, computer programs, or recording media.

The present disclosure can provide a data generator for achieving further improvement.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 4 is a diagram illustrating one example where a wide-area top-view image is generated from top-view images of the respective vehicles in the embodiment;

FIG. 5A is a flow chart indicating an overall processing operation performed by the data generator according to the embodiment;

DETAILED DESCRIPTION OF THE EMBODIMENTS

Figure 1:
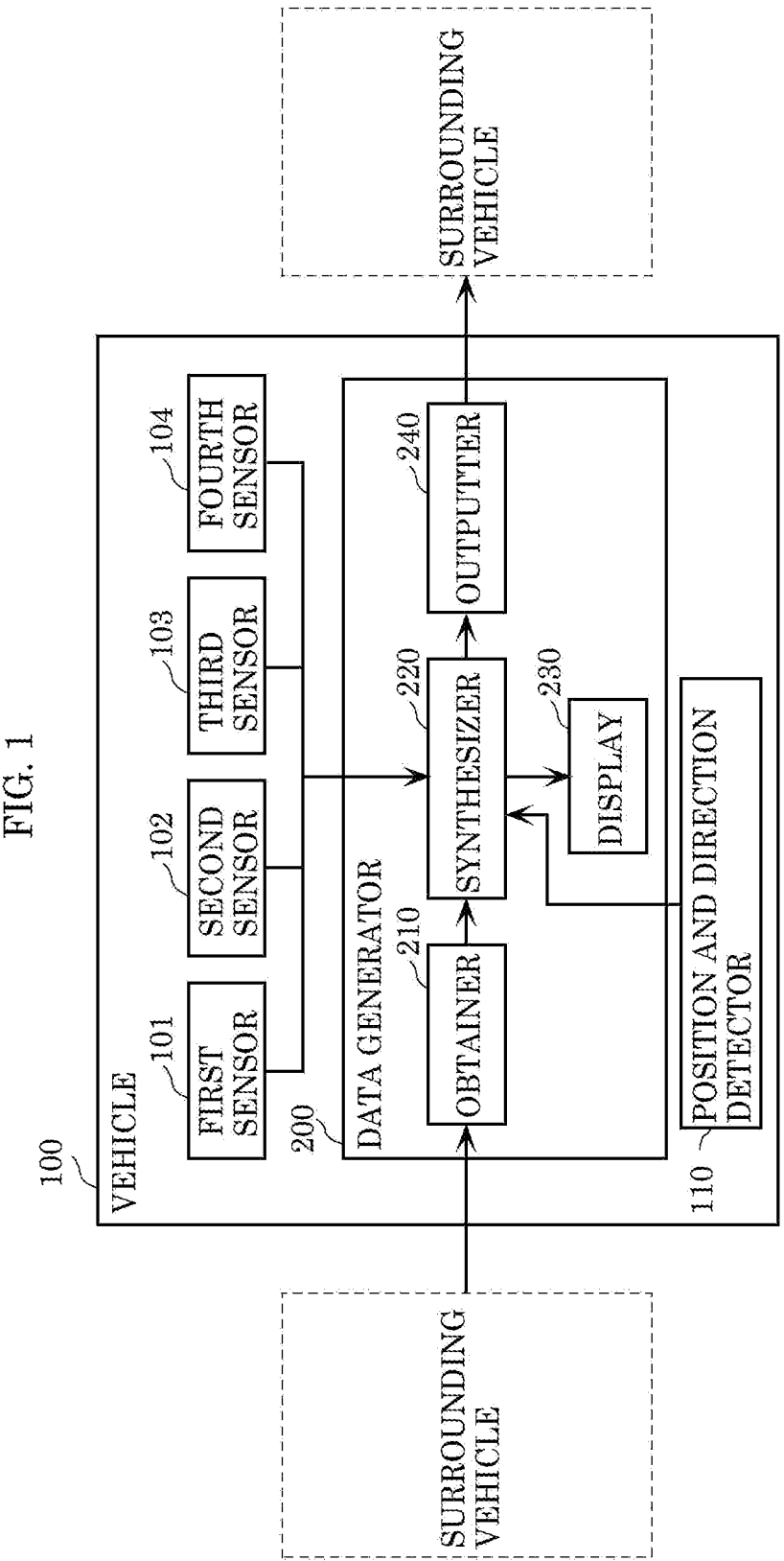
FIG. 1 is a block diagram illustrating a functional configuration of a data generator according to an embodiment.

A data generator according to an aspect of the present disclosure includes circuitry and memory connected to the circuitry. The circuitry, in operation: obtains sensing data from each of a plurality of moving bodies that includes a plurality of sensors, the sensing data being configured based on results of sensing by the plurality of sensors; and generates synthesized data by mapping the sensing data of the moving body into a virtual space, and when generating the synthesized data, determines a position of the sensing data to be mapped into the virtual space, based at least on a position of the moving body in a real space corresponding to the sensing data. For example, the moving body is a vehicle, the sensing data is a top-view image, and the synthesized data is a wide-area top-view image.

In this way, not only the environment of a surrounding area of one moving body but also the environment of surrounding areas of the plurality of moving bodies are sensed, and synthesized data which represents the sensed environment into the virtual space is generated. Thus, it is possible to appropriately recognize the wider-range environment. Furthermore, when the moving body moves, it is possible to change the position of the sensing data of the moving body in the virtual space according to the position of the moving body. Accordingly, even when the plurality of moving bodies move, it is possible to generate synthesized data to track the movements.

In addition, each of the plurality of sensors may be a camera, and the circuitry may obtain an image as the sensing data.

In this way, since the synthesized data indicating the environment of the surrounding areas of the moving bodies is generated, it is possible to visually easily recognize the wide-area environment by looking at the image.

In addition, when determining the position of the sensing data, the circuitry may extract a feature point from the image which is the sensing data, and determine the position of the sensing data according to the feature point extracted and the position of the moving body in the real space corresponding to the sensing data.

In this way, the position of the sensing data is determined based not only on the position of the moving body but also on the feature point of the image, and thus it is possible to map the sensing data more accurately.

In addition, the circuitry may further: obtain, from each of the plurality of moving bodies, position information at a time when the sensing data of the moving body is generated, the position information indicating the position of the moving body in the real space; and when generating the synthesized data, determine the position of the sensing data in the virtual space obtained from the moving body, based on the position indicated by the position information of the moving body.

In this way, since the position information is obtained from the moving body, it is possible to easily identify the position of the moving body in the real space, and to reduce processing load required to determine the position of the sensing data.

In addition, the circuitry may further: obtain, from each of the plurality of moving bodies, direction information at a time when the sensing data of the moving body is generated, the direction information indicating a traveling direction of the moving body; and when generating the synthesized data, determine a direction of the sensing data in the virtual space obtained from the moving body, based on the traveling direction indicated by the direction information of the moving body.

In this way, since the direction of the sensing data of the moving body is determined based on the direction information of the moving body, it is possible to map the sensing data in an appropriate direction. As a result, it is possible to map the sensing data more accurately.

In addition, the circuitry may: when obtaining the sensing data, cyclically obtain, from each of the plurality of moving bodies, the sensing data and time information indicating a time at which the sensing data is generated; and when generating the synthesized data: select, from the sensing data obtained cyclically from the moving body, particular sensing data generated at a time in a predetermined period, and map the particular sensing data selected into the virtual space, the time in the predetermined period being indicated by the time information corresponding to the sensing data.

In this way, the sensing data mapped in the virtual space are particular sensing data generated in the predetermined period. Accordingly, it is possible to appropriately synchronize sensing data of the respective moving bodies which are mapped into the virtual space.

In addition, when obtaining the sensing data, the circuitry may obtain the sensing data from each of the plurality of moving bodies in a predetermined positional relationship.

For example, the plurality of moving bodies are arranged in a line and are platooning in line with each other in the predetermined positional relationship. In such a case, since the synthesized data is generated, one of the plurality of moving bodies can easily recognize the environment of a surrounding area of another moving body included in the plurality of moving bodies and located forward or backward of the one moving body.

In addition, each of the plurality of moving bodies may be a vehicle, and the plurality of moving bodies may be arranged in a line and move in line with each other in the predetermined positional relationship. When generating the synthesized data, the circuitry may generate a wide-area top-view image which is the synthesized data by mapping, into a two-dimensional space which is the virtual space, top-view images each of which is the sensing data obtained from a corresponding one of the plurality of moving bodies arranged in the line. Each of the top-view images may be an image of a surrounding area of the moving body corresponding to the top-view image when seen from above the moving body.

In this way, the wide-area top-view image which is the image of the vehicles platooning in line with each other when seen from above the vehicles is generated. Accordingly, the one of the platooning vehicles can easily recognize the environment of the surrounding areas of the vehicles based on the wide-area top-view image even when the field of view of the one vehicle is blocked by the other vehicle located forward or backward of the one moving body. As a result, it is possible to appropriately help driving in platooning.

In addition, the circuitry may display an image represented by the synthesized data onto a display.

In this way, for example, it is possible to provide a driver of the vehicle with the synthesized data, and to appropriately help driving of the vehicle.

Hereinafter, embodiments are described in detail with reference to the drawings.

It is to be noted that the embodiments described below each indicates a general or specific example. The numerical values, shapes, materials, constituent elements, the arrangement and connection of the constituent elements, steps, order of the steps, etc., indicated in the following embodiments are mere examples, and therefore are not intended to limit the scope of the claims. Therefore, among the constituent elements in the following embodiments, those not recited in any of the independent claims defining the broadest inventive concepts are described as optional components.

Embodiment 1

FIG. 1 is a block diagram illustrating a functional configuration of a data generator according to an embodiment.

Vehicle 100 includes first sensor 101, second sensor 102, third sensor 103, fourth sensor 104, position and direction detector 110, and data generator 200.

Each of first sensor 101, second sensor 102, third sensor 103, and fourth sensor 104 is configured as a camera for instance. Specifically, first sensor 101 is a camera which images a forward area of vehicle 100. Second sensor 102 is a camera which images a left-side area of vehicle 100. Third sensor 103 is a camera which images a right-side area of vehicle 100. Fourth sensor 104 is a camera which images a backward area of vehicle 100.

Position and direction detector 110 detects a current position and a current traveling direction of vehicle 100, and outputs, to data generator 200, position information indicating the position detected and direction information indicating the traveling direction detected. For example, position and direction detector 110 cyclically performs such detection, and outputs, to data generator 200, position information and direction information which are the results of the detection. Specifically, position and direction detector 110 detects the positions and traveling directions using a global navigation satellite system (GNSS). In other words, position and direction detector 110 detects the positions and the traveling directions by receiving signals transmitted from the satellite.

Data generator 200 synthesizes a top-view image of vehicle 100 and a top-view image of at least one surrounding vehicle to generate a wide-area top-view image as the synthesized data. Data generator 200 includes obtainer 210, synthesizer 220, display 230, and outputter 240.

Obtainer 210 obtains a top-view image from each of the at least one surrounding vehicle. The top-view image obtained from the at least one surrounding vehicle is an image of the surrounding area of the at least one surrounding vehicle when seen from above the surrounding vehicle.

Synthesizer 220 obtains, from each of first sensor 101, second sensor 102, third sensor 103, and fourth sensor 104, an image captured by the sensor. Next, synthesizer 220 synthesizes the captured image obtained from each sensor to generate the top-view image of vehicle 100. The top-view image is an image of a surrounding area of vehicle 100 when seen from above vehicle 100.

Furthermore, synthesizer 220 synthesizes the top-view image of vehicle 100 and the at least one top-view image obtained by obtainer 210, to generate the wide-area top-view image. Synthesizer 220 uses the position information and the direction information output from position and direction detector 110 when generating the wide-area top-view image.

Display 230 includes a liquid crystal display, a plasma display, or an organic electro-luminescent (EL) display. Display 230 displays the wide-area top-view image generated by synthesizer 220.

Outputter 240 transmits the top-view image of vehicle 100 generated by synthesizer 220 to the at least one surrounding vehicle.

Here, the at least one surrounding vehicle which transmits the top-view image to data generator 200 of vehicle 100 may be the same as or different from the at least one surrounding vehicle which receives the top-view image of vehicle 100. In addition, each of the at least one surrounding vehicle which transmits the top-view image to data generator 200 of vehicle 100 may include a plurality of sensors similarly to vehicle 100, and may generate a top-view image of a surrounding vehicle based on a result of sensing performed by the sensor.

Accordingly, data generator 200 in the embodiment obtains, from each of moving bodies, sensing data configured based on the results of sensing by the sensors provided to the moving body. The moving bodies include vehicle 100 and at least one surrounding vehicle. In addition, the sensing data is a top-view image. Next, data generator 200 generates synthesized data which is a wide-area top-view image by mapping the sensing data of each of the moving bodies into a virtual space. Here, when generating the synthesized data, data generator 200 according to the embodiment determines the position of the sensing data to be mapped into the virtual space, according to at least the position of the moving body in a real space corresponding to the sensing data. It is to be noted that the position of the moving body in the real space is the position of vehicle 100 or the at least one surrounding vehicle detected by GNSS or the like.

In this way, not only the environment of a surrounding area of one moving body but also the environment of surrounding areas of the plurality of moving bodies are sensed, and synthesized data which represents the sensed environment into the virtual space is generated. Thus, it is possible to appropriately recognize the wider-range environment. Furthermore, when each of the plurality of moving bodies moves, it is possible to change the position of the sensing data of the moving body in the virtual space according to the position of the moving body in the real space. Accordingly, even when the plurality of moving bodies move, it is possible to generate synthesized data to track the movements.

In addition, in this embodiment, a plurality of sensors such as first sensor 101, second sensor 102, third sensor 103, and fourth sensor 104 provided to each of a plurality of vehicles are each a camera. Data generator 200 according to this embodiment obtains an image as sensing data. In this way, since the synthesized data representing the environment of the surroundings of the vehicles is generated, it is possible to visually easily recognize the wide-area environment by looking at the image (that is, the wide-area top-view image).

In addition, in this embodiment, the image represented by the synthesized data is displayed on display 230. In this way, for example, it is possible to provide a driver of vehicle 100 with the synthesized data, and to appropriately help driving of vehicle 100.

Figure 2:
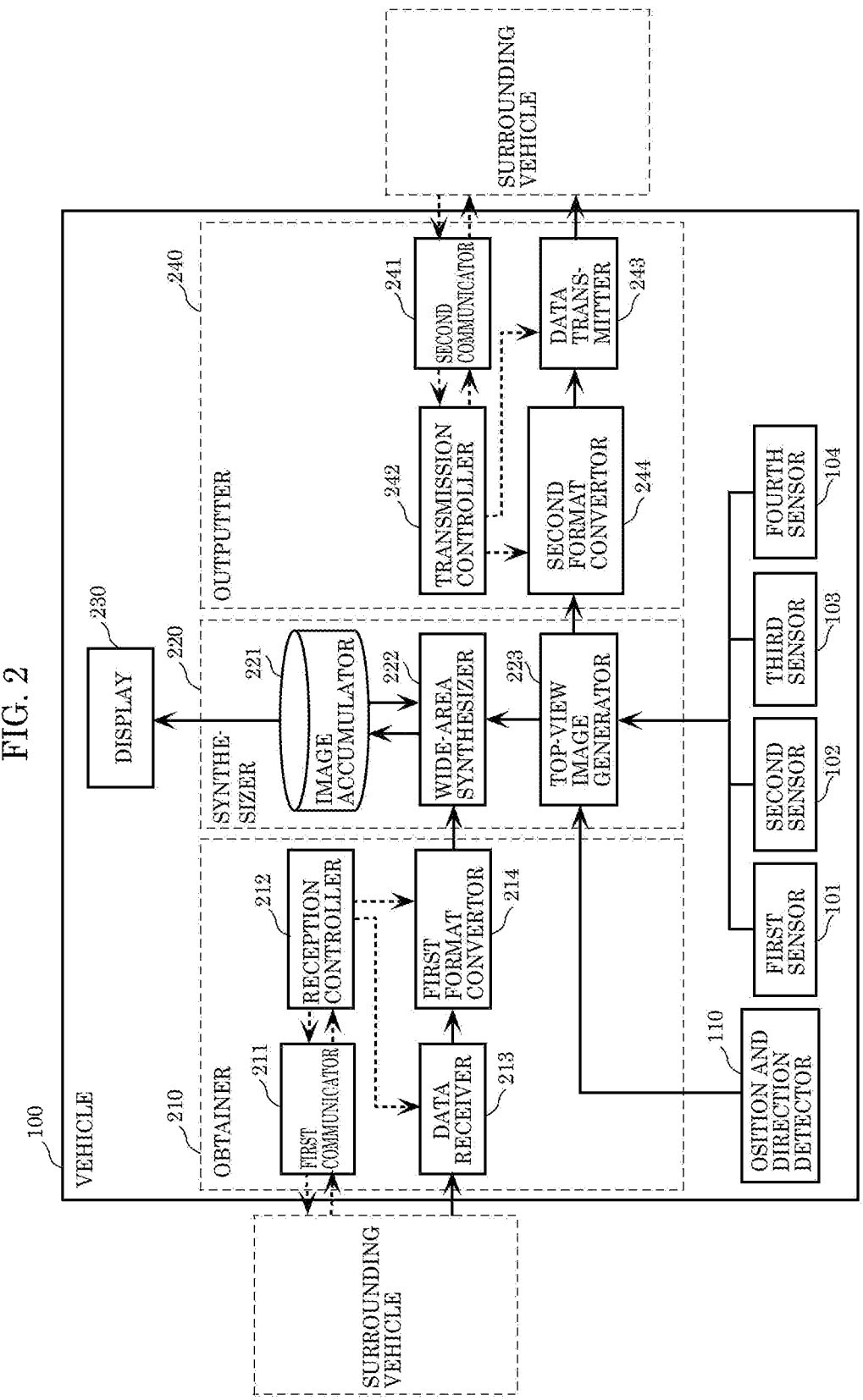
FIG. 2 is a block diagram illustrating a detailed functional configuration of the data generator according to the embodiment.

FIG. 2 is a block diagram illustrating a detailed functional configuration of data generator 200.

Obtainer 210 of data generator 200 includes first communicator 211, reception controller 212, data receiver 213, and first format convertor 214.

Reception controller 212 controls first communicator 211, data receiver 213, and first format convertor 214.

First communicator 211 establishes a communication path between surrounding vehicles under control by reception controller 212, and requests the surrounding vehicles to data transmission. It is to be noted that each surrounding vehicle to which data transmission is requested is referred to as a request-destination surrounding vehicle hereinafter. At this time, first communicator 211 exchanges information related to data formats supported by the request-destination surrounding vehicles under control by reception controller 212.

Data receiver 213 receives the top-view image of each of the request-destination surrounding vehicles using the communication path established by first communicator 211. The top-view image includes control information including time information, position information, and direction information added thereto. Time information indicates time at which the top-view image of a surrounding vehicle is generated. Position information indicates the position of the surrounding vehicle at the time when the top-view image is generated, and direction information indicates the traveling direction of the surrounding vehicle at the time when the top-view image is generated.

First format convertor 214 converts the data format of the top-view image received by data receiver 213 into a predefined data format, and outputs the top-view image having the converted data format to synthesizer 220.

Here, upon receiving the data transmission request from obtainer 210, the surrounding vehicle cyclically transmits an aforementioned top-view image. In other words, obtainer 210 obtains an image signal including top-view images generated by the surrounding vehicle, and outputs the image signal subjected to the format conversion to synthesizer 220. It is to be noted that each of the top-view images obtained in such a manner includes aforementioned control information added thereto.

In addition, when the image signal has been encoded, first format convertor 214 may decode the encoded image signal. In other words, first format convertor 214 may be configured as a decoder, an image decoder, or a video decoder. For example, first format convertor 214 decodes an image signal encoded based on a video compression standard that is the H.264, high efficiency video coding (HEVC), or the like according to a decoding method, an image decoding method, or a video decoding method according to the standard.

Synthesizer 220 of data generator 200 includes image accumulator 221, wide-area synthesizer 222, and top-view image generator 223.

Top-view image generator 223 obtains, from each of first sensor 101, second sensor 102, third sensor 103, and fourth sensor 104, an image captured by the sensor. Top-view image generator 223 then synthesizes the captured image obtained from each sensor to generate the top-view image of vehicle 100. Specifically, top-view image generator 223 cyclically generates a top-view image. In other words, each of first sensor 101, second sensor 102, third sensor 103, and fourth sensor 104 performs imaging at a predetermined frame rate, and repeatedly outputs an image captured at the frame rate. Top-view image generator 223 synthesizes the images captured by these sensors at substantially same timings to generate a top-view image of vehicle 100. For example, top-view image generator 223 repeatedly generates a top-view image at the aforementioned frame rate, and outputs the generated top-view image to wide-area synthesizer 222.

Here, each time when a top-view image is generated, top-view image generator 223 adds control information including time information, position information, and direction information to the top-view image. Time information indicates time at which the top-view image is generated. Position information and direction information indicate a position and a direction detected by position and direction detector 110, respectively. Specifically, position information indicates the position of vehicle 100 at the time when the top-view image is generated, and direction information indicates the traveling direction of vehicle 100 at the time.

Wide-area synthesizer 222 obtains an image signal of a surrounding vehicle from obtainer 210, and cyclically obtains a top-view image of vehicle 100 from top-view image generator 223. Each time when wide-area synthesizer 222 obtains a top-view image of vehicle 100 from top-view image generator 223, wide-area synthesizer 222 selects the top-view image of a surrounding vehicle corresponding to the top-view image of vehicle 100 from the image signal of the top-view image of vehicle 100. For example, wide-area synthesizer 222 selects the top-view image of the surrounding vehicle using time information added to the top-view image of vehicle 100 and time information added to the top-view image included in the image signal of the surrounding vehicle. Specifically, wide-area synthesizer 222 selects the top-view image of the surrounding vehicle added with time information indicating the time which is the same as the time indicated by the time information of the top-view image of vehicle 100 or a time which is within a predetermined allowable error range.

Wide-area synthesizer 222 synthesizes the top-view image of vehicle 100 and the top-view image of the selected surrounding vehicle to generate a wide-area top-view image, and stores the generated one into image accumulator 221.

In this way, wide-area synthesizer 222 according to this embodiment cyclically obtains the top-view image which is sensing data from each of vehicles including vehicle 100 and the at least one surrounding vehicle and time information indicating the time at which the top-view image has been generated. Wide-area synthesizer 222 then selects, for each vehicle, a particular top-view image whose time indicated by time information corresponding to the top-view image is within a predetermined period from among top-view images obtained cyclically from the vehicle. Wide-area synthesizer 222 maps the selected particular top-view image into the virtual space.

In this way, each of the top-view images mapped into the virtual space is the particular top-view image generated in the predetermined period. Accordingly, it is possible to appropriately synchronize top-view images of the respective moving bodies mapped into the virtual space.

Image accumulator 221 is a recording medium for storing wide-area top-view images generated by wide-area synthesizer 222. For example, image accumulator 221 is a hard disc, a read only memory (RAM), a random access memory (ROM), a semiconductor memory, or the like. It is to be noted that image accumulator 221 may be volatile or non-volatile.

Outputter 240 of data generator 200 includes second communicator 241, transmission controller 242, data transmitter 243, and second format convertor 244.

Transmission controller 242 controls second communicator 241, data transmitter 243, and second format convertor 244.

Upon receiving a data transmission request from a surrounding vehicle, second communicator 241 establishes a communication path with the surrounding vehicle under control by transmission controller 242. It is to be noted that the surrounding vehicle which made the data transmission request is referred to as a request-source surrounding vehicle hereinafter. Furthermore, second communicator 241 exchanges information related to data formats supported by the request-source surrounding vehicles under control by transmission controller 242.

Each time when a top-view image of vehicle 100 is generated by top-view image generator 223, second format convertor 244 obtains the generated top-view image of vehicle 100. Second format convertor 244 then converts the data format of the top-view image into a data format supported by the request-source surrounding vehicle under control of transmission controller 242.

In addition, second format convertor 244 may encode at least one top-view image of vehicle 100. In other words, second format convertor 244 may be configured with an encoder, an image encoder, or a video encoder. For example, second format convertor 244 encodes each top-view image according to an encoding method, an image encoding method, or a video encoding method according to the standard based on a video compression standard that is the H.264, high efficiency video coding (HEVC), or the like.

Each time when the data format of a top-view image of vehicle 100 is converted by second format convertor 244, data transmitter 243 obtains the post-conversion top-view image. Data transmitter 243 then transmits the top-view image of vehicle 100 to the request-source surrounding vehicle using the communication path established by second communicator 241. In other words, data transmitter 243 transmits the image signal including top-view images of vehicle 100 to the request-source surrounding vehicle. It is to be noted that each top-view image included in the image signal includes the aforementioned control information added thereto.

It is to be noted that, when at least one top-view image of vehicle 100 is encoded by second format convertor 244, data transmitter 243 transmits a stream or a bitstream generated through the encoding to the request-source surrounding vehicle.

In this way, when top-view images are encoded based on any of the video compression standards, it is possible to reduce the data amount of the top-view images, and furthermore to reduce processing delay. For example, it is possible to reduce delay of display of a wide-area top-view image configured with the top-view images.

Figure 3:
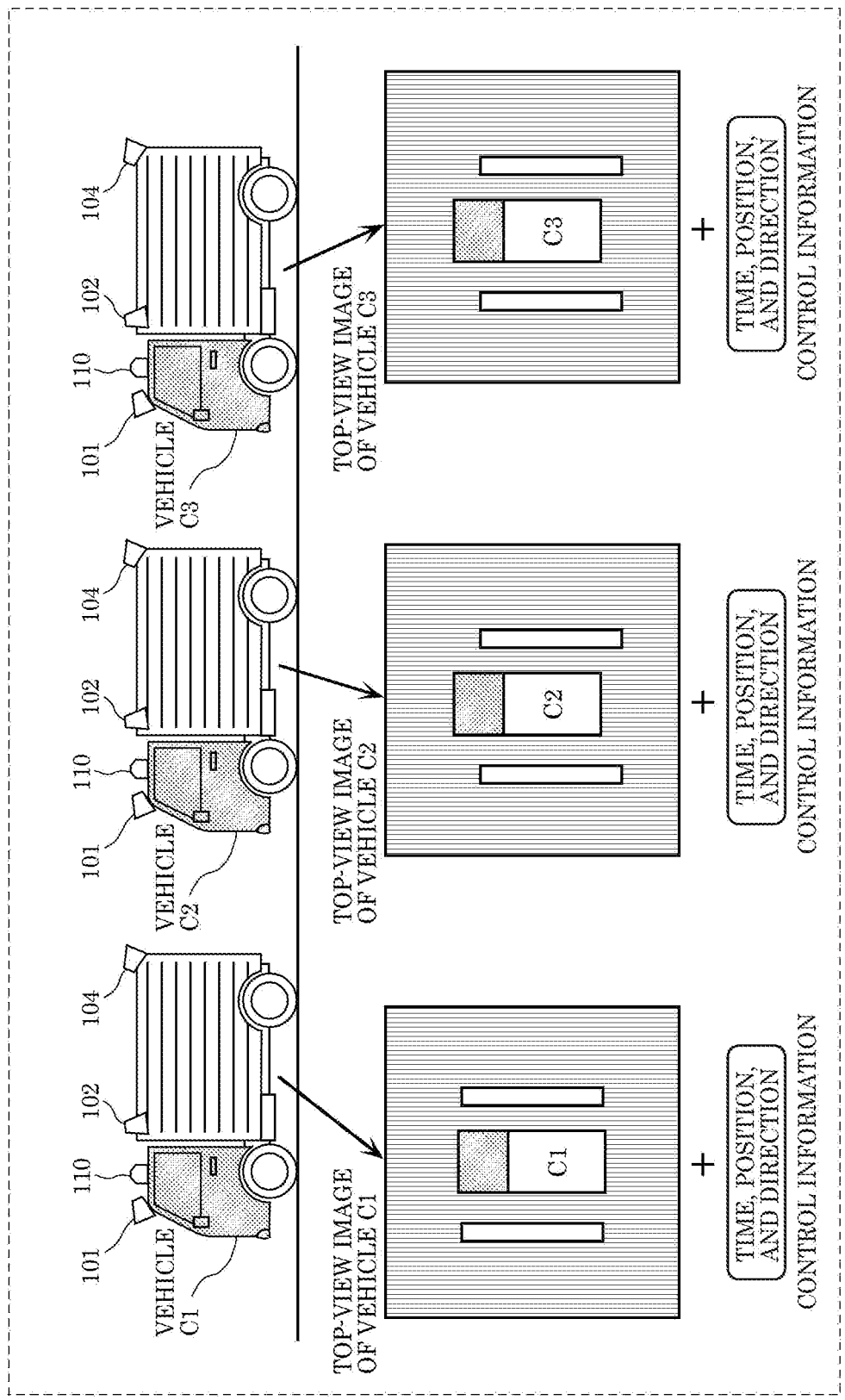
FIG. 3 is a diagram illustrating one example of platooning of three vehicles in the embodiment.

FIG. 3 is a diagram illustrating one example of platooning of three vehicles in the embodiment.

For example, as illustrated in FIG. 3, vehicle C1, vehicle C2, and vehicle C3 are platooning. In other words, vehicle C1, vehicle C2, and vehicle C3 arranged in a line are platooning in line with each other on a road in the same traveling direction. For example, each of vehicle C1, vehicle C2, and vehicle C3 has a configuration similar to the configuration of vehicle 100.

In this case, vehicle C1 generates a top-view image of vehicle C1, vehicle C2 generates a top-view image of vehicle C2, and vehicle C3 generates a top-view image of vehicle C3. As illustrated in FIG. 3, the top-view image of vehicle C1 is an image of a surrounding area of vehicle C1 when seen from above vehicle C1. The top-view image of each of vehicle C2 and vehicle C3 is also an image when seen from above the vehicle similar to the top-view image of vehicle C1.

In addition, the top-view image of vehicle C1 is added with control information indicating the time, the position, and the traveling direction at the time when the top-view image is generated. Likewise, the top-view image of vehicle C2 is added with control information indicating the time, the position, and the traveling direction at the time when the top-view image is generated, and the top-view image of vehicle C3 is added with control information indicating the time, the position, and the traveling direction at the time when the top-view image is generated.

For example, vehicle C2 is an own vehicle, and each of vehicle C1 and vehicle C3 is a surrounding vehicle of vehicle C2. In this case, vehicle C2 which is the own vehicle receives a top-view image of vehicle C1 that is the surrounding vehicle from vehicle C1, and receives a top-view image of vehicle C3 that is the surrounding vehicle from vehicle C3. Furthermore, vehicle C2 which is the own vehicle generates a top-view image of vehicle C2, and generates a wide-area top-view image by synthesizing the top-view image of the own vehicle and the top-view images of the two surrounding vehicles.

Furthermore, upon receiving a data transmission request from each of the two surrounding vehicles, vehicle C2 which is the own vehicle transmits the top-view image of vehicle C2 to each surrounding vehicle.

FIG. 4 is a diagram illustrating one example where a wide-area top-view image is generated from top-view images of the respective vehicles.

For example, vehicle C2 which is the own vehicle synthesizes a top-view image of vehicle C2 on a lane image based on map information. Map information is information for use in, for example, a car navigation system, and is stored in a recording medium of vehicle C2. In addition, map information may be obtained by vehicle C2 via a network such as the Internet, and may be stored in the recording medium of vehicle C2.

Specifically, wide-area synthesizer 222 provided to data generator 200 of vehicle C2 obtains the top-view image of vehicle C2 from top-view image generator 223. Wide-area synthesizer 222 then identifies the position of vehicle C2 indicated by control information added to the top-view image. Wide-area synthesizer 222 extracts, from the map information, the lane image associated with the identified position in the map information. For example, the identified position is the center of the lane image.

Next, wide-area synthesizer 222 identifies the traveling direction indicated by the control information of the top-view image of vehicle C2. Wide-area synthesizer 222 changes the direction of the top-view image of vehicle C2 based on the identified traveling direction, and superimposes the top-image at the position identified earlier in the lane image. For example, wide-area synthesizer 222 superimposes the top-view image onto the lane image by rotating the direction and position of the top-view image to match the direction and position of the lane image. In this way, a provisional wide-area top-view image is generated.

Next, wide-area synthesizer 222 generates a final wide-area top-view image by synthesizing the top-view image of vehicle C1 which is the surrounding vehicle and the top-view image of vehicle C3 which is the surrounding vehicle into the provisional wide-area top-view image.

Here, when synthesizing the top-view images of the surrounding vehicles into the provisional wide-area top-view image, wide-area synthesizer 222 performs synthesis position determination processing for determining the synthesis positions and the synthesis directions of the top-view images. Wide-area synthesizer 222 changes the directions of the surrounding vehicles to the directions determined through synthesis position determination processing. Wide-area synthesizer 222 then superimposes the top-view images of the surrounding vehicles at the synthesis positions, that is, the positions determined through the synthesis position determination processing in the provisional wide-area top-view image.

FIG. 5A is a flow chart indicating an overall processing operation performed by data generator 200.

First, synthesizer 220 of data generator 200 generates a top-view image of vehicle 100 which is an own vehicle, and handles the top-view image as a provisional wide-area top-view image (Step S10). It is to be noted that, at this time, synthesizer 220 may generate the provisional top-view image by superimposing the top-view image of vehicle 100 onto a lane image.

Next, data generator 200 extracts at least one feature point included in the provisional wide-area top-view image (Step S20). For example, the feature point is obtained through image processing that is for example the scale-invariant feature transform (SIFT), speed-upped robust feature (SURF), oriented-BRIEF (ORB), accelerated KAZE (AKAZE), or the like.

Data generator 200 then executes the processing in Steps S30 to S50 on each of the at least one surrounding vehicle.

In Step S30, wide-area synthesizer 222 obtains the top-view image of the surrounding vehicle corresponding to the time information of the top-view image of vehicle 100 generated in Step S10, from an image signal transmitted from the surrounding vehicle. Furthermore, data generator 200 obtains the direction information and the position information added to the top-view image of the surrounding vehicle.

In Step S40, wide-area synthesizer 222 executes synthesis position determination processing of determining the synthesis position of the top-view image of the surrounding vehicle in the provisional wide-area top-view image, using at least one feature point extracted in Step S20.

In Step S50, wide-area synthesizer 222 synthesizes the top-view image of the surrounding vehicle at the synthesis position determined through the synthesis position determination processing in the provisional wide-area top-view image.

A final wide-area top-view image is generated by means of the processing in Steps S30 to S50 being executed on the surrounding vehicle.

Data generator 200 then displays the generated final wide-area top-view image on display 230 to present the wide-area top-view image to a driver of the own vehicle (Step S60).

Figure 5B:
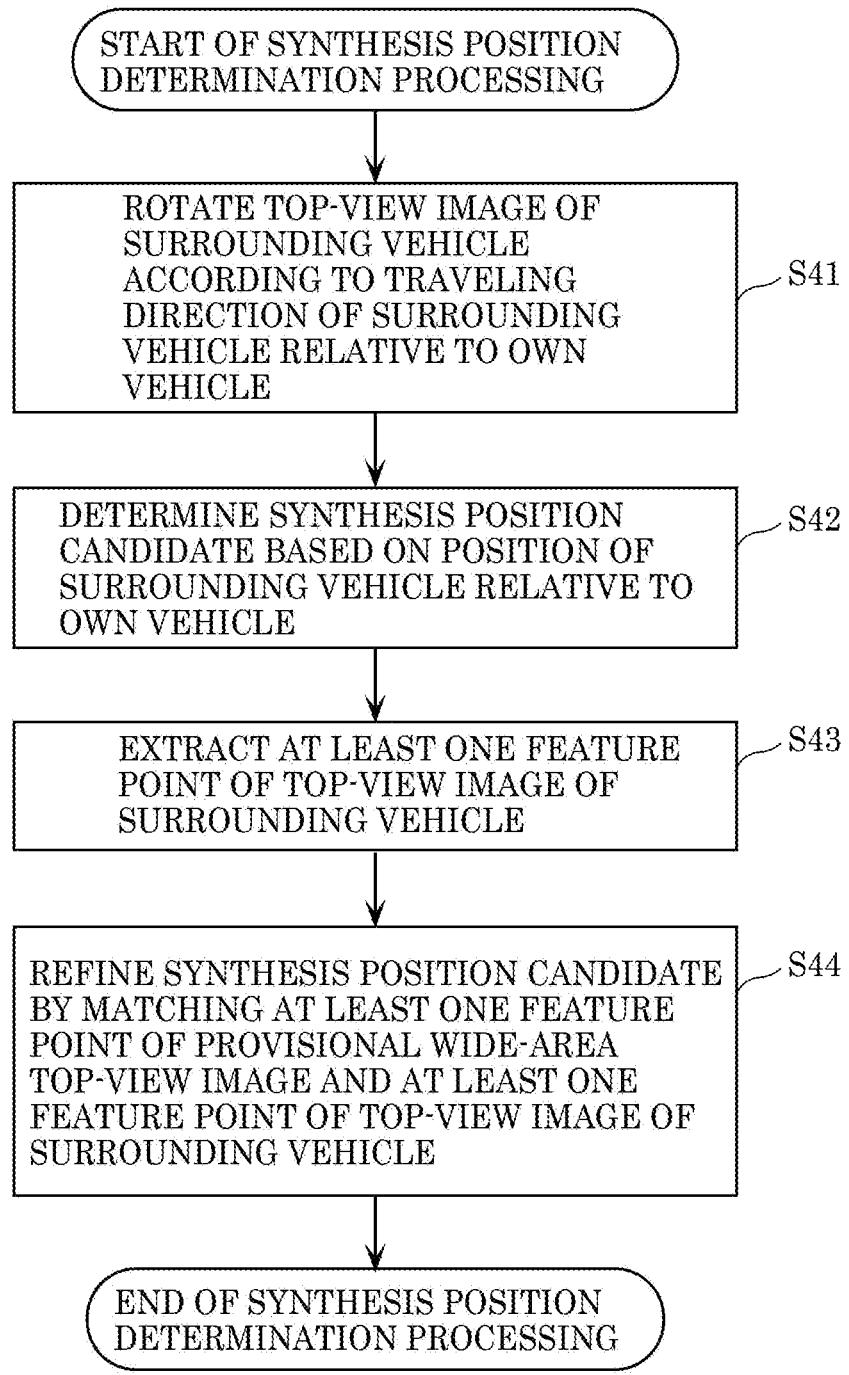
FIG. 5B is a flow chart indicating synthesis position determination processing performed by a wide-area synthesizer according to the embodiment.

FIG. 5B is a flow chart indicating synthesis position determination processing performed by wide-area synthesizer 222. In other words, FIG. 5B is a flow chart indicating the processing in Step S40 in FIG. 5A in detail.

Wide-area synthesizer 222 rotates the top-view image of the surrounding vehicle according to the traveling direction of the surrounding vehicle relative to the own vehicle (Step S41). For example, wide-area synthesizer 222 identifies the traveling direction of the own vehicle indicated by the direction information added to the top-view image of the own vehicle and the traveling direction of the surrounding vehicle indicated by the direction information added to the top-view image of the surrounding vehicle.

Wide-area synthesizer 222 then rotates the top-view image of the surrounding vehicle by the difference between the traveling directions.

Next, wide-area synthesizer 222 determines a synthesis position candidate in the wide-area top-view image, based on the position of the surrounding vehicle relative to the own vehicle (Step S42). For example, wide-area synthesizer 222 identifies the position of the own vehicle indicated by the position information added to the top-view image of the own vehicle and the position of the surrounding vehicle indicated by the position information added to the top-view image of the surrounding vehicle. Wide-area synthesizer 222 then determines the synthesis position candidate in the provisional wide-area top-view image, based on the relative relationship between the positions.

Wide-area synthesizer 222 further extracts at least one feature point from the top-view image of the surrounding vehicle.

Wide-area synthesizer 222 then performs matching between the at least one feature point in the provisional wide-area top-view image extracted in Step S20 indicated in FIG. 5A and the at least one feature point in the top-view image of the surrounding vehicle extracted in Step S43. In this way, wide-area synthesizer 222 refines the synthesis position candidate determined in Step S42 (Step S44).

In this way, wide-area synthesizer 222 according to this embodiment extracts the feature points from the image (that is the top-view image) which is the sensing data, and determines the synthesis position of the top-view image according to the extracted feature points and the position of the vehicle in the real space corresponding to the top-view image. In this way, since the position of the top-view image is determined based not only on the position of each vehicle but also on the feature points of the image, it is possible to map the top-view image more accurately.

In addition, synthesizer 220 in this embodiment obtains, from each of the vehicles, the position information indicating the position of the vehicle in the real space at the time when the top-view image of the vehicle has been generated. Wide-area synthesizer 222 then determines the position of the top-view image obtained from the vehicle in the virtual space, based on the position indicated by the position information of the vehicle. In this way, since the position information is obtained from the vehicle, it is possible to easily identify the position of the vehicle in the real space, and to reduce processing load required to determine the position of the top-view image.

In addition, synthesizer 220 in this embodiment obtains, from each of the vehicles, the direction information indicating the traveling direction of the vehicle at the time when the top-view image of the vehicle has been generated. Wide-area synthesizer 222 then determines the direction of the top-view image obtained from the vehicle, based on the traveling position indicated by the direction information of the vehicle. In this way, since the direction of the top-view image of the vehicle in the virtual space is determined based on the direction information of the vehicle, it is possible to map the top-view image in an appropriate direction. As a result, it is possible to map the top-view image more accurately.

In addition, data generator 200 according to this embodiment obtains a top-view image from each of vehicles in a predetermined positional relationship. For example, the plurality of moving bodies are arranged in a line and are platooning in line with each other in the predetermined positional relationship.

In such a case, for example, a wide-area top-view image is generated as synthesized data, and thus one of the vehicles can easily recognize the environment of the surrounding area of another vehicle located forward or backward of the one vehicle.

Wide-area synthesizer 222 according to this embodiment generates the wide-area top-view image which is synthesized data by mapping the top-view images of the vehicles arranged in the line obtained from the vehicles into a two-dimensional space which is the virtual space. These top-view images are images of surrounding areas of the vehicles respectively corresponding to the top-view images when seen from above the respective vehicles.

In this way, the wide-area top-view image which is the image of the vehicles platooning in line with each other when seen from above the vehicles is generated. Accordingly, the one of the platooning vehicles can easily recognize the environment of the surrounding areas of the vehicles based on the wide-area top-view image even when the field of view of the one vehicle is blocked by the other vehicle located forward or backward of the one moving body. As a result, it is possible to appropriately help driving in platooning.

Figure 6A:
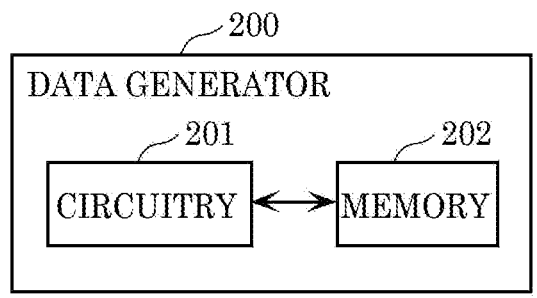
FIG. 6A is a block diagram illustrating a mounting example of the data generator according to the embodiment.

FIG. 6A is a block diagram illustrating a mounting example of data generator 200 according to this embodiment. Data generator 200 includes circuitry 201 and memory 202. For example, the constituent elements of data generator 200 illustrated in each of FIGS. 1 and 2 are mounted on circuitry 201 and memory 202 illustrated in FIG. 6A.

Circuitry 201 is circuitry which performs information processing and is connected to memory 202. For example, circuitry 201 is dedicated or general-purpose electronic circuitry which generates data such as a wide-area top-view image. Circuitry 201 may be a processor such as a CPU. In addition, circuitry 201 may be a combination of electronic circuits. In addition, for example, circuitry 201 may take the roles of constituent elements other than the constituent element for storing information among the constituent elements of data generator 200 illustrated in each of FIGS. 1 and 2.

Memory 202 is general-purpose or dedicated memory into which information for allowing circuitry 201 to generate data such as a wide-area top-view image is stored. Memory 202 may be electronic circuitry. In addition, memory 202 may be included in circuitry 201. In addition, memory 202 may be a combination of electronic circuits. In addition, memory 202 may be a magnetic disc, an optical disc, or the like, or may be represented as storage, a recording medium, or the like. In addition, memory 202 may be a non-volatile memory, or a volatile memory.

For example, memory 202 may store an image for generating a wide-area top-view image, or may store a program for causing circuitry 201 to generate a wide-area top-view image.

In addition, for example, memory 202 may take the role of the constituent element for storing information among the constituent elements of data generator 200 illustrated in each of FIGS. 1 and 2. Specifically, memory 202 may take the role of image accumulator 221 illustrated in FIG. 2.

It is to be noted that, in data generator 200, not all the constituent elements illustrated in FIGS. 1 and 2 need to be mounted, and not all the above-described processes need to be performed. A part of the constituent elements illustrated in FIGS. 1 and 2 may be included in another device, or a part of the above-described processes may be executed by another device.

Figure 6B:
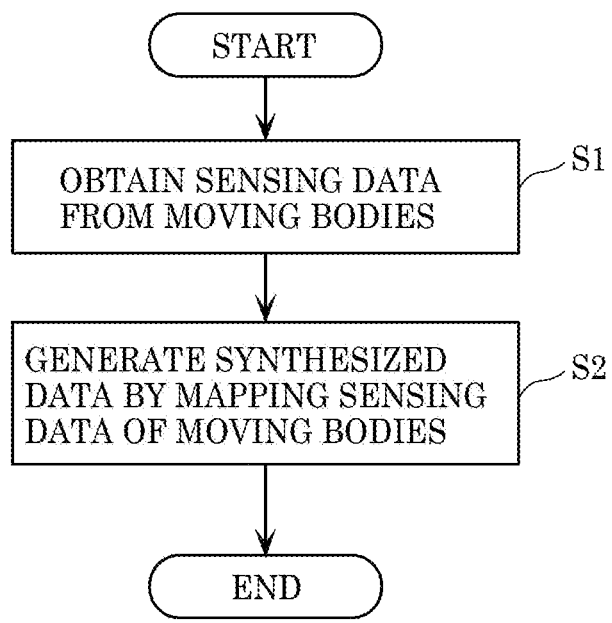
FIG. 6B is a flow chart indicating a processing operation performed by the data generator including circuitry and memory according to the embodiment.

FIG. 6B is a flow chart indicating a processing operation performed by data generator 200 including circuitry 201 and memory 202.

Circuitry 201 connected to memory 202 obtains, in operation, sensing data configured based on results of sensing by the sensors provided to each of the moving bodies (Step S1). Next, circuitry 201 generates synthesized data by mapping the sensing data of each of the moving bodies in a virtual space (Step S2). Here, when generating the synthesized data, circuitry 201 determines the position of the sensing data mapped in the virtual space, according to the position of the moving body in a real space corresponding to the sensing data. It is to be noted that the sensing data obtained by circuitry 201 from each of the moving bodies may be the aforementioned top-view image, or the results of sensing (that are, captured images) by the sensors provided to the moving body.

As described above, since the synthesized data indicating not only the environment of the surrounding area of one moving body but also the environment of the surrounding areas of the moving bodies is generated, data generator 200 according to this embodiment is capable of appropriately recognizing the wider-range environment. Furthermore, when each of the plurality of moving bodies moves, it is possible to change the position of the sensing data of the moving body in the virtual space according to the position of the moving body in the real space. Accordingly, even when the plurality of moving bodies move, it is possible to generate synthesized data to track the movements.

Variations

Although data generator 200 is provided to a moving body such as vehicle 100 in the above embodiment, data generator 200 may be provided to an external device or a server outside a moving body. In this case, data generator 200 may obtain a top-view image of each of vehicles including vehicle 100 and generate a wide-area top-view image instead of generating a top-view image of vehicle 100 as in the above embodiment. For example, wide-area synthesizer 222 and image accumulator 221 included in data generator 200 may be provided to the device or the server. In addition, the device or the server may be at least part of a traffic monitoring cloud.

In addition, although top-view images are communicated through inter-vehicle communication in the above embodiment, such top-view images may be communicated via the traffic monitoring cloud. In this case, the traffic monitoring cloud may request data transmission.

In addition, although each surrounding vehicle transmits a top-view image to the own vehicle in the above embodiment, the surrounding vehicle may transmit an image captured by each of the cameras provided to the surrounding vehicle. In other words, the surrounding vehicle may transmit captured images to be used to generate top-view images instead of the top-view images. In this case, data generator 200 of the own vehicle receives the captured images transmitted from the surrounding vehicle, and generates top-view images of the surrounding vehicle using the captured images. In addition, when the images captured by the cameras are transmitted to the own vehicle, the surrounding vehicle may transmit a parameter set of each of the cameras to the own vehicle. The parameter set may include a parameter indicating the position of the camera in the surrounding vehicle, an internal parameter indicating lens distortion, etc. of the camera, and an external parameter indicating the posture of the camera. Data generator 200 of the own vehicle generates a top-view image of the surrounding vehicle using the parameter set.

In addition, the surrounding vehicle may transmit a partial image of the top-view image instead of transmitting the entire top-view image to the own vehicle. For example, data generator 200 of the own vehicle may specify, for the surrounding vehicle, a part to be transmitted in the top-view image of the surrounding vehicle, according to a relative positional relationship between the own vehicle and the surrounding vehicle. At least one of the position, size, and shape of the part to be transmitted in the entire top-view image may be specified. Alternatively, the surrounding vehicle may identify a part to be transmitted in the top-view image according to a relative positional relationship with the own vehicle, and transmit the identified part to data generator 200 of the own vehicle.

The position in the above embodiment may be either a relative position or an absolute position. A standard of the relative position may be either the surrounding vehicle or the own vehicle. Such standards may vary between vehicles.

In addition, although the wide-area top-view image that is the synthesized data is displayed by display 230 in the above embodiment, the wide-area top-view image may be used for signal processing without being displayed. In this case, data generator 200 does not always need to include display 230.

In addition, although the sensing data in the above embodiment are top-view images, sensing data may be one or more other images, data obtainable by light detection and ranging (LIDAR) or infrared cameras, or data obtainable by other sensors.

In addition, at least one feature point is used for synthesis position determination processing in the above embodiment, a synthesis position may be determined based on the position of a vehicle without using any feature point when no feature point can be obtained. In addition, although data generator 200 of the own vehicle obtains position information from the surrounding vehicle, data generator 200 may detect the position of the surrounding vehicle instead of obtaining the position information. For example, data generator 200 may detect the position of the surrounding vehicle by a sensor such as a LIDAR or a millimeter-wave radar.

In addition, the time managed by each of the vehicles including the own vehicle and the surrounding vehicle(s) may be periodically synchronized using a time synchronizing server such as a network time protocol (NTP) server. In the case of platooning, a time synchronizing server may be installed in one of vehicles which are platooning. Alternatively, a time synchronizing server may be installed for each country or region.

In addition, although vehicle C2 is the own vehicle and vehicle C1 and vehicle C3 are the surrounding vehicles in the example of platooning illustrated in FIGS. 3 and 4, vehicle C1 or vehicle C3 may be the own vehicle and the other vehicles may be surrounding vehicles. For example, data generator 200 of leading vehicle C1 may present a wide-area top-view image of the entire line of vehicles to a driver of leading vehicle C1.

In addition, when an inter-vehicle distance is preset in a platooning system, the position and angle of each of cameras arranged in each of vehicles may be set so that top-view images of the vehicles overlap with each other.

In addition, data generator 200 of the own vehicle may detect one or more surrounding vehicles travelling around the own vehicle through inter-vehicle communication, and switch images to be presented to the driver of the own vehicle according to the result(s) of the detection. For example, data generator 200 of the own vehicle determines whether there is any surrounding vehicle travelling forward or backward of the own vehicle within a predetermined distance (for example, within 100 m). In the case of determining that there is a surrounding vehicle, data generator 200 of the own vehicle obtains a top-view image of the surrounding vehicle, synthesizes it with a top-view image of the own vehicle to generate a wide-area top-view image, and presents the generated wide-area top-view image to the driver of the own vehicle. In the other case of determining that there is no surrounding vehicle, data generator of the own vehicle may present a top-view image of the own vehicle to the driver of the own vehicle. In other words, data generator 200 of the own vehicle generates and presents the wide-area top-view image when vehicles including the own vehicle are in a predetermined positional relationship, and presents the top-view image of the own vehicle when the vehicles are not in the predetermined positional relationship.

In addition, although the virtual space in the above embodiment is the two-dimensional space such as a top-view image of the own vehicle, the lane image, or the lane image on which the top-view image of the own vehicle is superimposed, the virtual space may be a three-dimensional space.

In addition, vehicles are examples of moving bodies in the above embodiment, and thus bodies other than the vehicles such as ships and airplanes are also possible as long as the bodies are moving bodies.

In addition, although the number of sensors provided to vehicle 100 is 4 in the above embodiment, the number of sensors are not limited to 4, and thus may be three or less or five or above.

Although each of the constituent elements is configured with dedicated hardware, it is to be noted that each constituent element may be implemented by executing a software program suitable for the constituent element. Here, a software program which implements data generator 200, etc. according to the above embodiment causes a computer to execute processing according to any of the flow charts in FIGS. 5A, 5B, and 6B.

In addition, each constituent element may be circuitry as described above. Circuits may compose circuitry as a whole, or may be separate circuits. Alternatively, each constituent element may be implemented as a general processor, or may be implemented as a dedicated processor.

In addition, the process that is executed by a particular constituent element may be executed by another constituent element. In addition, the processing execution order may be modified, or a plurality of processes may be executed in parallel.

The ordinal numbers such as "first" and "second" used in the description may be arbitrarily changed. In addition, ordinal numbers may be arbitrarily added to constituent elements, etc. or may be removed from constituent elements, etc.

Although some aspects of the data generator have been explained based on the above embodiment, aspects of the data generator are not limited to the embodiment. The scope of the aspects of the data generator may encompass embodiments obtainable by adding, to any of these embodiments, various kinds of modifications that a person skilled in the art would arrive at without deviating from the scope of the present disclosure.

Other Embodiments

As described in the above embodiment, each functional block can typically be realized as an MPU and memory, for example. Moreover, processes performed by each of the functional blocks are typically realized by a program execution unit, such as a processor, reading and executing software (a program) recorded on a recording medium such as ROM. The software may be distributed via, for example, downloading, and may be recorded on a recording medium such as semiconductor memory and distributed. Note that each functional block can, of course, also be realized as hardware (dedicated circuit).

Moreover, the processing described in the embodiment may be realized via integrated processing using a single apparatus (system), and, alternatively, may be realized via decentralized processing using a plurality of apparatuses. Moreover, the processor that executes the above-described program may be a single processor or a plurality of processors. In other words, integrated processing may be performed, and, alternatively, decentralized processing may be performed.

Embodiments of the present disclosure are not limited to the above exemplary embodiment; various modifications may be made to the exemplary embodiment, the results of which are also included within the scope of the embodiment of the present disclosure.

Next, application examples of the moving picture encoding method (image encoding method) and the moving picture decoding method (image decoding method) described in the above embodiment and a system that employs the same will be described. The system is characterized as including an image encoder that employs the image encoding method, an image decoder that employs the image decoding method, and an image encoder/decoder that includes both the image encoder and the image decoder. Other configurations included in the system may be modified on a case-by-case basis.

[Usage Examples]

Figure 7:
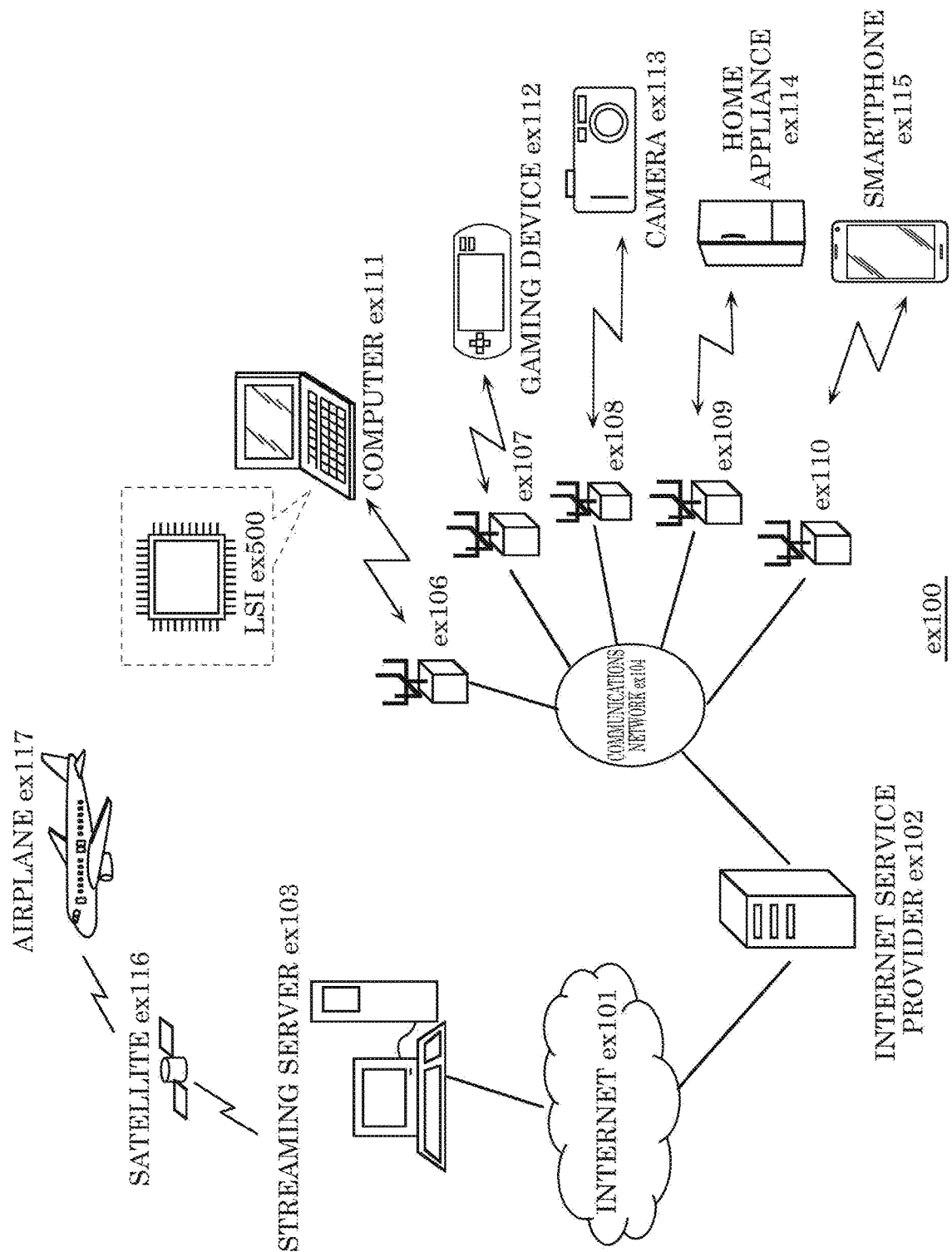
FIG. 7 illustrates an overall configuration of a content providing system for implementing a content distribution service.

FIG. 7 illustrates an overall configuration of content providing system ex100 for implementing a content distribution service. The area in which the communication service is provided is divided into cells of desired sizes, and base stations ex106, ex107, ex108, ex109, and ex110, which are fixed wireless stations, are located in respective cells.

In content providing system ex100, devices including computer ex111, gaming device ex112, camera ex113, home appliance ex114, and smartphone ex115 are connected to internet ex101 via internet service provider ex102 or communications network ex104 and base stations ex106 through ex110. Content providing system ex100 may combine and connect any combination of the above elements. The devices may be directly or indirectly connected together via a telephone network or near field communication rather than via base stations ex106 through ex110, which are fixed wireless stations. Moreover, streaming server ex103 is connected to devices including computer ex111, gaming device ex112, camera ex113, home appliance ex114, and smartphone ex115 via, for example, internet ex101. Streaming server ex103 is also connected to, for example, a terminal in a hotspot in airplane ex117 via satellite ex116.

Note that instead of base stations ex106 through ex110, wireless access points or hotspots may be used. Streaming server ex103 may be connected to communications network ex104 directly instead of via internet ex101 or internet service provider ex102, and may be connected to airplane ex117 directly instead of via satellite ex116.

Camera ex113 is a device capable of capturing still images and video, such as a digital camera. Smartphone ex115 is a smartphone device, cellular phone, or personal handyphone system (PHS) phone that can operate under the mobile communications system standards of the typical 2G, 3G, 3.9G, and 4G systems, as well as the next-generation 5G system.

Home appliance ex118 is, for example, a refrigerator or a device included in a home fuel cell cogeneration system.

In content providing system ex100, a terminal including an image and/or video capturing function is capable of, for example, live streaming by connecting to streaming server ex103 via, for example, base station ex106. When live streaming, a terminal (e.g., computer ex111, gaming device ex112, camera ex113, home appliance ex114, smartphone ex115, or airplane ex117) performs the encoding processing described in the above embodiment on still-image or video content captured by a user via the terminal, multiplexes video data obtained via the encoding and audio data obtained by encoding audio corresponding to the video, and transmits the obtained data to streaming server ex103. In other words, the terminal functions as the image encoder according to one aspect of the present disclosure.

Streaming server ex103 streams transmitted content data to clients that request the stream. Client examples include computer ex111, gaming device ex112, camera ex113, home appliance ex114, smartphone ex115, and terminals inside airplane ex117, which are capable of decoding the above-described encoded data. Devices that receive the streamed data decode and reproduce the received data. In other words, the devices each function as the image decoder according to one aspect of the present disclosure.

[Decentralized Processing]

Streaming server ex103 may be realized as a plurality of servers or computers between which tasks such as the processing, recording, and streaming of data are divided. For example, streaming server ex103 may be realized as a content delivery network (CDN) that streams content via a network connecting multiple edge servers located throughout the world. In a CDN, an edge server physically near the client is dynamically assigned to the client. Content is cached and streamed to the edge server to reduce load times. In the event of, for example, some kind of an error or a change in connectivity due to, for example, a spike in traffic, it is possible to stream data stably at high speeds since it is possible to avoid affected parts of the network by, for example, dividing the processing between a plurality of edge servers or switching the streaming duties to a different edge server, and continuing streaming.

Decentralization is not limited to just the division of processing for streaming; the encoding of the captured data may be divided between and performed by the terminals, on the server side, or both. In one example, in typical encoding, the processing is performed in two loops. The first loop is for detecting how complicated the image is on a frame-by-frame or scene-by-scene basis, or detecting the encoding load. The second loop is for processing that maintains image quality and improves encoding efficiency. For example, it is possible to reduce the processing load of the terminals and improve the quality and encoding efficiency of the content by having the terminals perform the first loop of the encoding and having the server side that received the content perform the second loop of the encoding. In such a case, upon receipt of a decoding request, it is possible for the encoded data resulting from the first loop performed by one terminal to be received and reproduced on another terminal in approximately real time. This makes it possible to realize smooth, real-time streaming.

In another example, camera ex113 or the like extracts a feature amount from an image, compresses data related to the feature amount as metadata, and transmits the compressed metadata to a server. For example, the server determines the significance of an object based on the feature amount and changes the quantization accuracy accordingly to perform compression suitable for the meaning of the image. Feature amount data is particularly effective in improving the precision and efficiency of motion vector prediction during the second compression pass performed by the server. Moreover, encoding that has a relatively low processing load, such as variable length coding (VLC), may be handled by the terminal, and encoding that has a relatively high processing load, such as context-adaptive binary arithmetic coding (CABAC), may be handled by the server.

In yet another example, there are instances in which a plurality of videos of approximately the same scene are captured by a plurality of terminals in, for example, a stadium, shopping mall, or factory. In such a case, for example, the encoding may be decentralized by dividing processing tasks between the plurality of terminals that captured the videos and, if necessary, other terminals that did not capture the videos and the server, on a per-unit basis. The units may be, for example, groups of pictures (GOP), pictures, or tiles resulting from dividing a picture. This makes it possible to reduce load times and achieve streaming that is closer to real-time.

Moreover, since the videos are of approximately the same scene, management and/or instruction may be carried out by the server so that the videos captured by the terminals can be cross-referenced. Moreover, the server may receive encoded data from the terminals, change reference relationship between items of data or correct or replace pictures themselves, and then perform the encoding. This makes it possible to generate a stream with increased quality and efficiency for the individual items of data.

Moreover, the server may stream video data after performing transcoding to convert the encoding format of the video data. For example, the server may convert the encoding format from MPEG to VP, and may convert H.264 to H.265.

In this way, encoding can be performed by a terminal or one or more servers. Accordingly, although the device that performs the encoding is referred to as a "server" or "terminal" in the following description, some or all of the processes performed by the server may be performed by the terminal, and likewise some or all of the processes performed by the terminal may be performed by the server. This also applies to decoding processes.

[3D, Multi-Angle]

In recent years, usage of images or videos combined from images or videos of different scenes concurrently captured or the same scene captured from different angles by a plurality of terminals such as camera ex113 and/or smartphone ex115 has increased. Videos captured by the terminals are combined based on, for example, the separately-obtained relative positional relationship between the terminals, or regions in a video having matching feature points.

In addition to the encoding of two-dimensional moving pictures, the server may encode a still image based on scene analysis of a moving picture either automatically or at a point in time specified by the user, and transmit the encoded still image to a reception terminal. Furthermore, when the server can obtain the relative positional relationship between the video capturing terminals, in addition to two-dimensional moving pictures, the server can generate three-dimensional geometry of a scene based on video of the same scene captured from different angles. Note that the server may separately encode three-dimensional data generated from, for example, a point cloud, and may, based on a result of recognizing or tracking a person or object using three-dimensional data, select or reconstruct and generate a video to be transmitted to a reception terminal from videos captured by a plurality of terminals.

This allows the user to enjoy a scene by freely selecting videos corresponding to the video capturing terminals, and allows the user to enjoy the content obtained by extracting, from three-dimensional data reconstructed from a plurality of images or videos, a video from a selected viewpoint. Furthermore, similar to with video, sound may be recorded from relatively different angles, and the server may multiplex, with the video, audio from a specific angle or space in accordance with the video, and transmit the result.

In recent years, content that is a composite of the real world and a virtual world, such as virtual reality (VR) and augmented reality (AR) content, has also become popular. In the case of VR images, the server may create images from the viewpoints of both the left and right eyes and perform encoding that tolerates reference between the two viewpoint images, such as multi-view coding (MVC), and, alternatively, may encode the images as separate streams without referencing. When the images are decoded as separate streams, the streams may be synchronized when reproduced so as to recreate a virtual three-dimensional space in accordance with the viewpoint of the user.

In the case of AR images, the server superimposes virtual object information existing in a virtual space onto camera information representing a real-world space, based on a three-dimensional position or movement from the perspective of the user. The decoder may obtain or store virtual object information and three-dimensional data, generate two-dimensional images based on movement from the perspective of the user, and then generate superimposed data by seamlessly connecting the images. Alternatively, the decoder may transmit, to the server, motion from the perspective of the user in addition to a request for virtual object information, and the server may generate superimposed data based on three-dimensional data stored in the server in accordance with the received motion, and encode and stream the generated superimposed data to the decoder. Note that superimposed data includes, in addition to RGB values, an a value indicating transparency, and the server sets the a value for sections other than the object generated from three-dimensional data to, for example, 0, and may perform the encoding while those sections are transparent. Alternatively, the server may set the background to a predetermined RGB value, such as a chroma key, and generate data in which areas other than the object are set as the background.

Decoding of similarly streamed data may be performed by the client (i.e., the terminals), on the server side, or divided therebetween. In one example, one terminal may transmit a reception request to a server, the requested content may be received and decoded by another terminal, and a decoded signal may be transmitted to a device having a display. It is possible to reproduce high image quality data by decentralizing processing and appropriately selecting content regardless of the processing ability of the communications terminal itself. In yet another example, while a TV, for example, is receiving image data that is large in size, a region of a picture, such as a tile obtained by dividing the picture, may be decoded and displayed on a personal terminal or terminals of a viewer or viewers of the TV. This makes it possible for the viewers to share a big-picture view as well as for each viewer to check his or her assigned area or inspect a region in further detail up close.

In the future, both indoors and outdoors, in situations in which a plurality of wireless connections are possible over near, mid, and far distances, it is expected to be able to seamlessly receive content even when switching to data appropriate for the current connection, using a streaming system standard such as MPEG-DASH. With this, the user can switch between data in real time while freely selecting a decoder or display apparatus including not only his or her own terminal, but also, for example, displays disposed indoors or outdoors. Moreover, based on, for example, information on the position of the user, decoding can be performed while switching which terminal handles decoding and which terminal handles the displaying of content. This makes it possible to, while in route to a destination, display, on the wall of a nearby building in which a device capable of displaying content is embedded or on part of the ground, map information while on the move. Moreover, it is also possible to switch the bit rate of the received data based on the accessibility to the encoded data on a network, such as when encoded data is cached on a server quickly accessible from the reception terminal or when encoded data is copied to an edge server in a content delivery service.

[Scalable Encoding]

Figure 8:
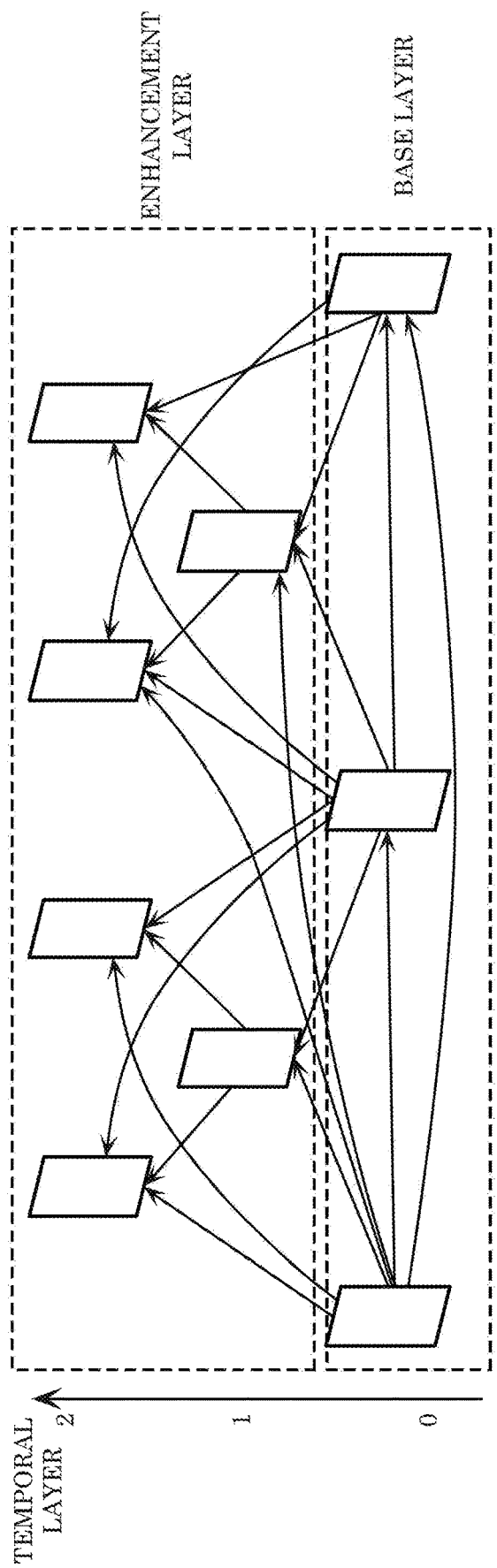
FIG. 8 illustrates one example of an encoding structure in scalable encoding.

The switching of content will be described with reference to a scalable stream, illustrated in FIG. 8, that is compression coded via implementation of the moving picture encoding method described in the above embodiment. The server may have a configuration in which content is switched while making use of the temporal and/or spatial scalability of a stream, which is achieved by division into and encoding of layers, as illustrated in FIG. 8. Note that there may be a plurality of individual streams that are of the same content but different quality. In other words, by determining which layer to decode up to based on internal factors, such as the processing ability on the decoder side, and external factors, such as communication bandwidth, the decoder side can freely switch between low resolution content and high resolution content while decoding. For example, in a case in which the user wants to continue watching, at home on a device such as a TV connected to the internet, a video that he or she had been previously watching on smartphone ex115 while on the move, the device can simply decode the same stream up to a different layer, which reduces server side load.

Furthermore, in addition to the configuration described above in which scalability is achieved as a result of the pictures being encoded per layer and the enhancement layer is above the base layer, the enhancement layer may include metadata based on, for example, statistical information on the image, and the decoder side may generate high image quality content by performing super-resolution imaging on a picture in the base layer based on the metadata. Super-resolution imaging may be improving the SN ratio while maintaining resolution and/or increasing resolution. Metadata includes information for identifying a linear or a non-linear filter coefficient used in super-resolution processing, or information identifying a parameter value in filter processing, machine learning, or least squares method used in super-resolution processing.

Figure 9:
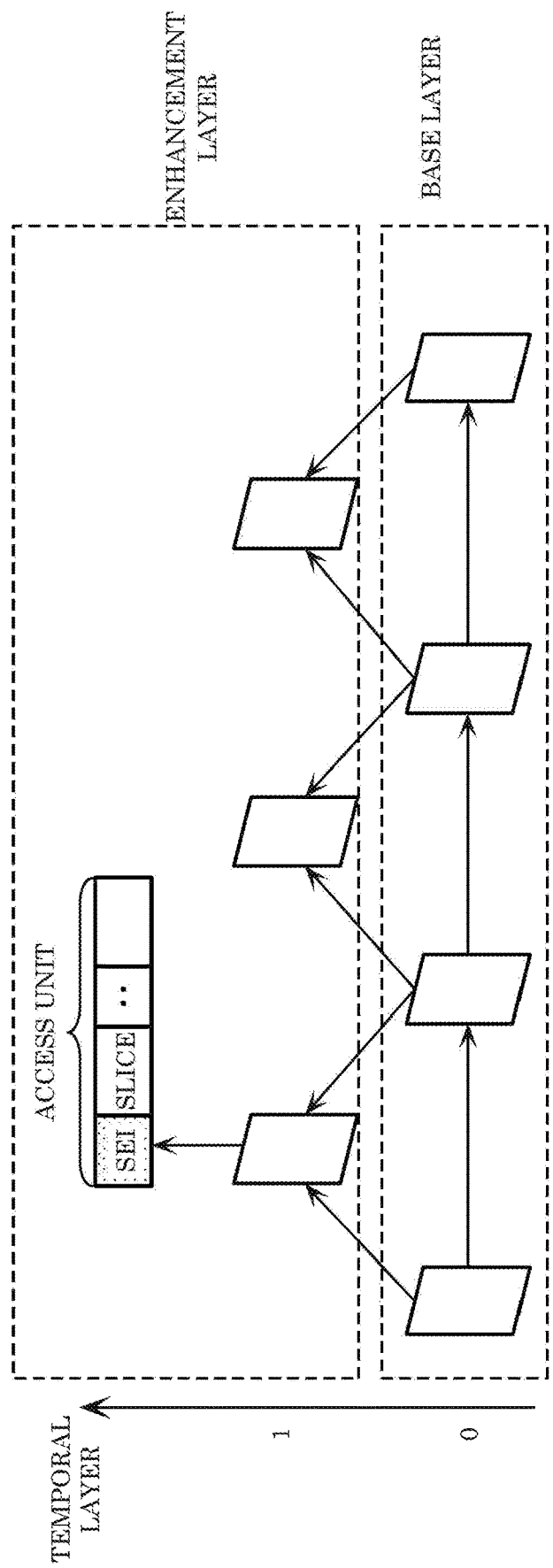
FIG. 9 illustrates one example of an encoding structure in scalable encoding.

Alternatively, a configuration in which a picture is divided into, for example, tiles in accordance with the meaning of, for example, an object in the image, and on the decoder side, only a partial region is decoded by selecting a tile to decode, is also acceptable. Moreover, by storing an attribute about the object (person, car, ball, etc.) and a position of the object in the video (coordinates in identical images) as metadata, the decoder side can identify the position of a desired object based on the metadata and determine which tile or tiles include that object. For example, as illustrated in FIG. 9, metadata is stored using a data storage structure different from pixel data such as an SEI message in HEVC. This metadata indicates, for example, the position, size, or color of the main object.

Moreover, metadata may be stored in units of a plurality of pictures, such as stream, sequence, or random access units. With this, the decoder side can obtain, for example, the time at which a specific person appears in the video, and by fitting that with picture unit information, can identify a picture in which the object is present and the position of the object in the picture.

[Web Page Optimization]

Figure 10:
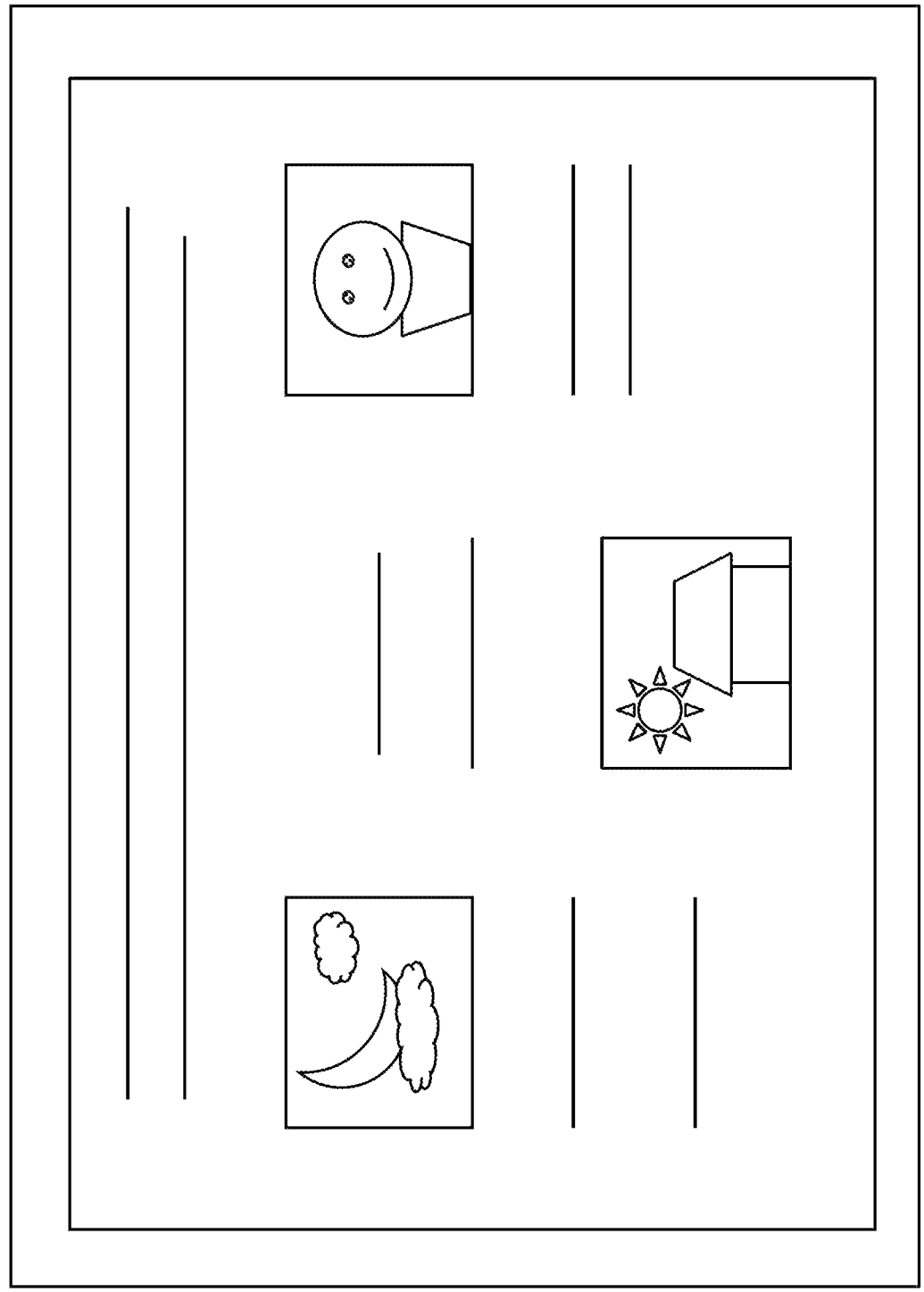
FIG. 10 illustrates an example of a display screen of a web page.
Figure 11:
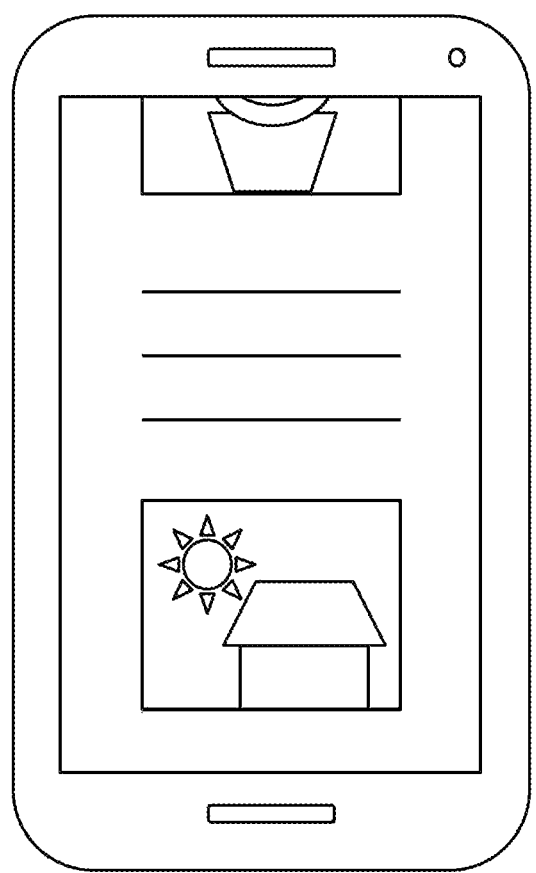
FIG. 11 illustrates an example of a display screen of a web page.

FIG. 10 illustrates an example of a display screen of a web page on, for example, computer ex111. FIG. 11 illustrates an example of a display screen of a web page on, for example, smartphone ex115. As illustrated in FIG. 10 and FIG. 11, a web page may include a plurality of image links which are links to image content, and the appearance of the web page differs depending on the device used to view the web page. When a plurality of image links are viewable on the screen, until the user explicitly selects an image link, or until the image link is in the approximate center of the screen or the entire image link fits in the screen, the display apparatus (decoder) displays, as the image links, still images included in the content or I pictures, displays video such as an animated gif using a plurality of still images or I pictures, for example, or receives only the base layer and decodes and displays the video.

When an image link is selected by the user, the display apparatus decodes giving the highest priority to the base layer. Note that if there is information in the HTML code of the web page indicating that the content is scalable, the display apparatus may decode up to the enhancement layer. Moreover, in order to guarantee real time reproduction, before a selection is made or when the bandwidth is severely limited, the display apparatus can reduce delay between the point in time at which the leading picture is decoded and the point in time at which the decoded picture is displayed (that is, the delay between the start of the decoding of the content to the displaying of the content) by decoding and displaying only forward reference pictures (I picture, P picture, forward reference B picture). Moreover, the display apparatus may purposely ignore the reference relationship between pictures and coarsely decode all B and P pictures as forward reference pictures, and then perform normal decoding as the number of pictures received over time increases.

[Autonomous Driving]

When transmitting and receiving still image or video data such two- or three-dimensional map information for autonomous driving or assisted driving of an automobile, the reception terminal may receive, in addition to image data belonging to one or more layers, information on, for example, the weather or road construction as metadata, and associate the metadata with the image data upon decoding. Note that metadata may be assigned per layer and, alternatively, may simply be multiplexed with the image data.

In such a case, since the automobile, drone, airplane, etc., including the reception terminal is mobile, the reception terminal can seamlessly receive and decode while switching between base stations among base stations ex106 through ex110 by transmitting information indicating the position of the reception terminal upon reception request. Moreover, in accordance with the selection made by the user, the situation of the user, or the bandwidth of the connection, the reception terminal can dynamically select to what extent the metadata is received or to what extent the map information, for example, is updated.

With this, in content providing system ex100, the client can receive, decode, and reproduce, in real time, encoded information transmitted by the user.

[Streaming of Individual Content]

In content providing system ex100, in addition to high image quality, long content distributed by a video distribution entity, unicast or multicast streaming of low image quality, short content from an individual is also possible. Moreover, such content from individuals is likely to further increase in popularity. The server may first perform editing processing on the content before the encoding processing in order to refine the individual content. This may be achieved with, for example, the following configuration.

In real-time while capturing video or image content or after the content has been captured and accumulated, the server performs recognition processing based on the raw or encoded data, such as capture error processing, scene search processing, meaning analysis, and/or object detection processing. Then, based on the result of the recognition processing, the server-either when prompted or automatically-edits the content, examples of which include: correction such as focus and/or motion blur correction; removing low-priority scenes such as scenes that are low in brightness compared to other pictures or out of focus: object edge adjustment; and color tone adjustment. The server encodes the edited data based on the result of the editing. It is known that excessively long videos tend to receive fewer views. Accordingly, in order to keep the content within a specific length that scales with the length of the original video, the server may, in addition to the low-priority scenes described above, automatically clip out scenes with low movement based on an image processing result. Alternatively, the server may generate and encode a video digest based on a result of an analysis of the meaning of a scene.

Note that there are instances in which individual content may include content that infringes a copyright, moral right, portrait rights, etc. Such an instance may lead to an unfavorable situation for the creator, such as when content is shared beyond the scope intended by the creator. Accordingly, before encoding, the server may, for example, edit images so as to blur faces of people in the periphery of the screen or blur the inside of a house, for example. Moreover, the server may be configured to recognize the faces of people other than a registered person in images to be encoded, and when such faces appear in an image, for example, apply a mosaic filter to the face of the person. Alternatively, as pre- or post-processing for encoding, the user may specify, for copyright reasons, a region of an image including a person or a region of the background be processed, and the server may process the specified region by, for example, replacing the region with a different image or blurring the region. If the region includes a person, the person may be tracked in the moving picture the head region may be replaced with another image as the person moves.

Moreover, since there is a demand for real-time viewing of content produced by individuals, which tends to be small in data size, the decoder first receives the base layer as the highest priority and performs decoding and reproduction, although this may differ depending on bandwidth. When the content is reproduced two or more times, such as when the decoder receives the enhancement layer during decoding and reproduction of the base layer and loops the reproduction, the decoder may reproduce a high image quality video including the enhancement layer. If the stream is encoded using such scalable encoding, the video may be low quality when in an unselected state or at the start of the video, but it can offer an experience in which the image quality of the stream progressively increases in an intelligent manner. This is not limited to just scalable encoding; the same experience can be offered by configuring a single stream from a low quality stream reproduced for the first time and a second stream encoded using the first stream as a reference.

[Other Usage Examples]

The encoding and decoding may be performed by LSI ex500, which is typically included in each terminal. ISI ex500 may be configured of a single chip or a plurality of chips. Software for encoding and decoding moving pictures may be integrated into some type of a recording medium (such as a CD-ROM, a flexible disk, or a hard disk) that is readable by, for example, computer ex111, and the encoding and decoding may be performed using the software. Furthermore, when smartphone ex115 is equipped with a camera, the video data obtained by the camera may be transmitted. In this case, the video data is coded by LSI ex500 included in smartphone ex115.

Note that LSI ex500 may be configured to download and activate an application. In such a case, the terminal first determines whether it is compatible with the scheme used to encode the content or whether it is capable of executing a specific service. When the terminal is not compatible with the encoding scheme of the content or when the terminal is not capable of executing a specific service, the terminal first downloads a codec or application software then obtains and reproduces the content.

Aside from the example of content providing system ex100 that uses internet ex101, at least the moving picture encoder (image encoder) or the moving picture decoder (image decoder) described in the above embodiment may be implemented in a digital broadcasting system. The same encoding processing and decoding processing may be applied to transmit and receive broadcast radio waves superimposed with multiplexed audio and video data using, for example, a satellite, even though this is geared toward multicast whereas unicast is easier with content providing system ex100.

[Hardware Configuration]

Figure 12:
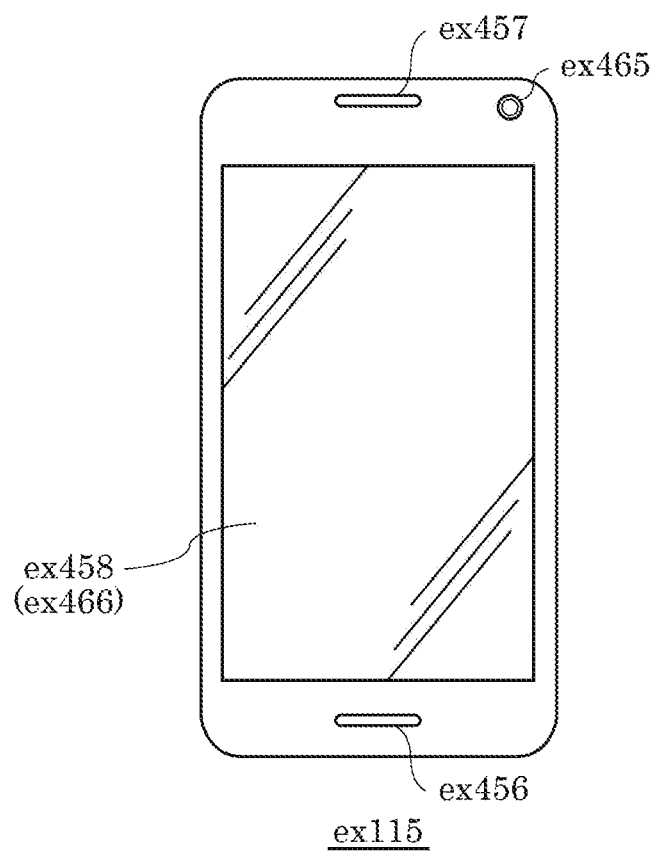
FIG. 12 illustrates one example of a smartphone.
Figure 13:
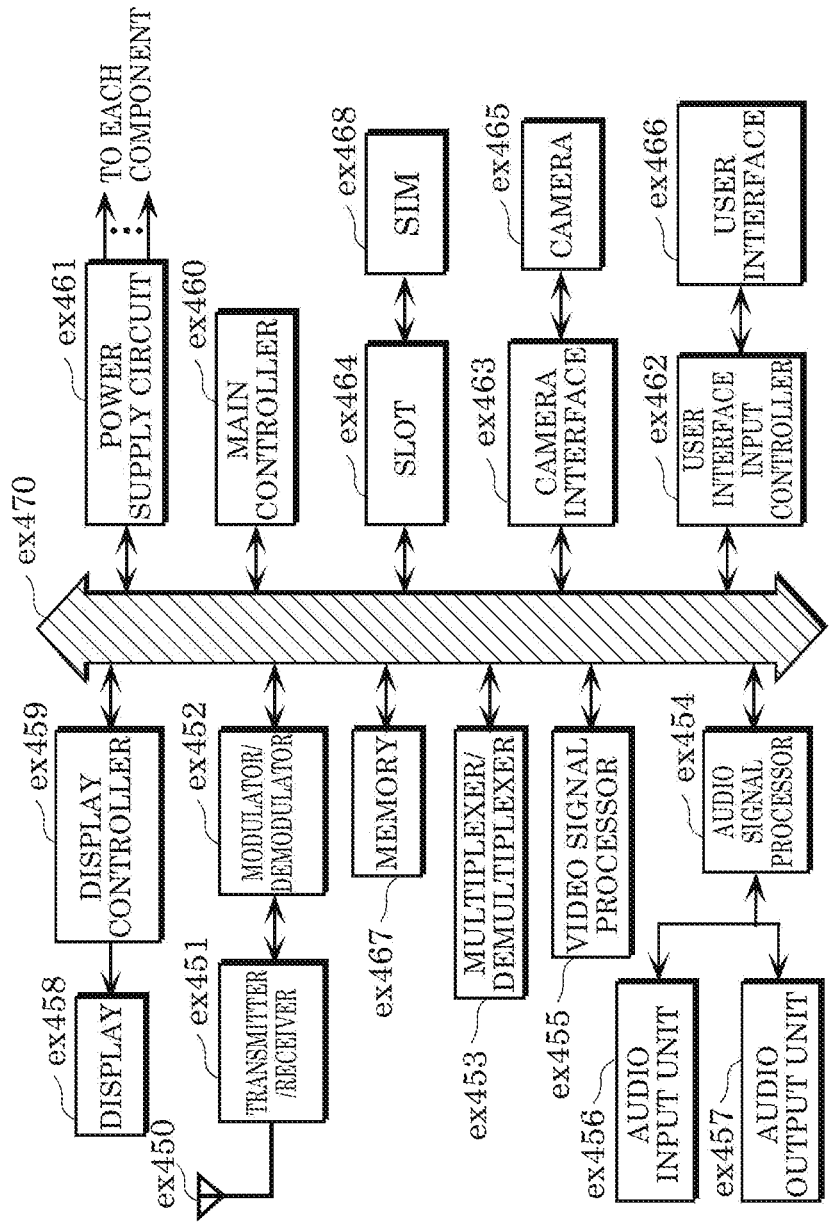
FIG. 13 is a block diagram illustrating a configuration example of a smartphone.

FIG. 12 illustrates smartphone ex115. FIG. 13 illustrates a configuration example of smartphone ex115. Smartphone ex115 includes antenna ex450 for transmitting and receiving radio waves to and from base station ex110, camera ex465 capable of capturing video and still images, and display ex458 that displays decoded data, such as video captured by camera ex465 and video received by antenna ex450. Smartphone ex115 further includes user interface ex466 such as a touch panel, audio output unit ex457 such as a speaker for outputting speech or other audio, audio input unit ex456 such as a microphone for audio input, memory ex467 capable of storing decoded data such as captured video or still images, recorded audio, received video or still images, and mail, as well as decoded data, and slot ex464 which is an interface for SIM ex468 for authorizing access to a network and various data. Note that external memory may be used instead of memory ex467.

Moreover, main controller ex460 which comprehensively controls display ex458 and user interface ex466, power supply circuit ex461, user interface input controller ex462, video signal processor ex455, camera interface ex463, display controller ex459, modulator/demodulator ex452, multiplexer/demultiplexer ex453, audio signal processor ex454, slot ex464, and memory ex467 are connected via bus ex470.

When the user turns the power button of power supply circuit ex461 on, smartphone ex115 is powered on into an operable state by each component being supplied with power from a battery pack.

Smartphone ex115 performs processing for, for example, calling and data transmission, based on control performed by main controller ex460, which includes a CPU, ROM, and RAM. When making calls, an audio signal recorded by audio input unit ex456 is converted into a digital audio signal by audio signal processor ex454, and this is applied with spread spectrum processing by modulator/demodulator ex452 and digital-analog conversion and frequency conversion processing by transmitter/receiver ex451, and then transmitted via antenna ex450. The received data is amplified, frequency converted, and analog-digital converted, inverse spread spectrum processed by modulator/demodulator ex452, converted into an analog audio signal by audio signal processor ex454, and then output from audio output unit ex457. In data transmission mode, text, still-image, or video data is transmitted by main controller ex460 via user interface input controller ex462 as a result of operation of, for example, user interface ex466 of the main body, and similar transmission and reception processing is performed. In data transmission mode, when sending a video, still image, or video and audio, video signal processor ex455 compression encodes, via the moving picture encoding method described in the above embodiment, a video signal stored in memory ex467 or a video signal input from camera ex465, and transmits the encoded video data to multiplexer/demultiplexer ex453. Moreover, audio signal processor ex454 encodes an audio signal recorded by audio input unit ex456 while camera ex465 is capturing, for example, a video or still image, and transmits the encoded audio data to multiplexer/demultiplexer ex453. Multiplexer/demultiplexer ex453 multiplexes the encoded video data and encoded audio data using a predetermined scheme, modulates and converts the data using modulator/demodulator (modulator/demodulator circuit) ex452 and transmitter/receiver ex451, and transmits the result via antenna ex450.

When video appended in an email or a chat, or a video linked from a web page, for example, is received, in order to decode the multiplexed data received via antenna ex450, multiplexer/demultiplexer ex453 demultiplexes the multiplexed data to divide the multiplexed data into a bitstream of video data and a bitstream of audio data, supplies the encoded video data to video signal processor ex455 via synchronous bus ex470, and supplies the encoded audio data to audio signal processor ex454 via synchronous bus ex470. Video signal processor ex455 decodes the video signal using a moving picture decoding method corresponding to the moving picture encoding method described in the above embodiment, and video or a still image included in the linked moving picture file is displayed on display ex458 via display controller ex459. Moreover, audio signal processor ex454 decodes the audio signal and outputs audio from audio output unit ex457. Note that since real-time streaming is becoming more and more popular, there are instances in which reproduction of the audio may be socially inappropriate depending on the users environment. Accordingly, as an initial value, a configuration in which only video data is reproduced, i.e., the audio signal is not reproduced, is preferable. Audio may be synchronized and reproduced only when an input, such as when the user clicks video data, is received.

Although smartphone ex115 was used in the above example, three implementations are conceivable: a transceiver terminal including both an encoder and a decoder; a transmitter terminal including only an encoder: and a receiver terminal including only a decoder. Further, in the description of the digital broadcasting system, an example is given in which multiplexed data obtained as a result of video data being multiplexed with, for example, audio data, is received or transmitted, but the multiplexed data may be video data multiplexed with data other than audio data, such as text data related to the video. Moreover, the video data itself rather than multiplexed data maybe received or transmitted.

Although main controller ex460 including a CPU is described as controlling the encoding or decoding processes, terminals often include GPUs. Accordingly, a configuration is acceptable in which a large area is processed at once by making use of the performance ability of the GPU via memory shared by the CPU and GPU or memory including an address that is managed so as to allow common usage by the CPU and GPU. This makes it possible to shorten encoding time, maintain the real-time nature of the stream, and reduce delay. In particular, processing relating to motion estimation, deblocking filtering, sample adaptive offset (SAO), and transformation/quantization can be effectively carried out by the GPU instead of the CPU in units of, for example pictures, all at once.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The data generator according to the present disclosure provides advantageous effects of enabling further improvements, and is highly applicable because the data generator is applicable to, for example, an on-board device for helping driving of the vehicle on which the device is mounted.

What is claimed is:

1. A data generator, comprising:
   circuitry; and
   memory connected to the circuitry,
   wherein the circuitry, in operation:
      obtains sensing data from each of a plurality of moving bodies that includes a plurality of sensors, the sensing data being configured based on results of sensing by the plurality of sensors; and
      generates synthesized data by mapping the sensing data of the moving body into a virtual space, wherein when generating the synthesized data, the circuitry determines a position of the sensing data to be mapped into the virtual space, based at least on a position of the moving body in a real space corresponding to the sensing data, and
   wherein the circuitry further:
      obtains, from each of the plurality of moving bodies, position information at a time when the sensing data of the moving body is generated, the position information indicating the position of the moving body in the real space; and
      when generating the synthesized data, determines the position of the sensing data in the virtual space obtained from the moving body, based on the position indicated by the position information of the moving body.

2. The data generator according to claim 1,
   wherein each of the plurality of sensors is a camera, and
   the circuitry obtains an image as the sensing data.

3. The data generator according to claim 2,
   wherein when determining the position of the sensing data, the circuitry, (i) extracts a feature point from the image which is the sensing data, and (ii) determines the position of the sensing data according to the feature point extracted and the position of the moving body in the real space corresponding to the sensing data.

4. The data generator according to claim 1,
   wherein the circuitry further:
      obtains, from each of the plurality of moving bodies, direction information at a time when the sensing data of the moving body is generated, the direction information indicating a traveling direction of the moving body; and
      when generating the synthesized data, determines a direction of the sensing data in the virtual space obtained from the moving body, based on the traveling direction indicated by the direction information of the moving body.

5. The data generator according to claim 1,
   wherein the circuitry:
      when obtaining the sensing data, cyclically obtains, from each of the plurality of moving bodies, the sensing data and time information indicating a time at which the sensing data is generated; and
      when generating the synthesized data, (i) selects, from the sensing data obtained cyclically from the moving body, particular sensing data generated at a time in a predetermined period, and (ii) maps the particular sensing data selected into the virtual space, the time in the predetermined period being indicated by the time information corresponding to the sensing data.

6. The data generator according to claim 1,
   wherein when obtaining the sensing data, the circuitry:
   obtains the sensing data from each of the plurality of moving bodies in a predetermined positional relationship.

7. The data generator according to claim 6,
   wherein each of the plurality of moving bodies is a vehicle,
   the plurality of moving bodies are arranged in a line and move in line with each other in the predetermined positional relationship, and
   when generating the synthesized data, the circuitry:
      generates a wide-area top-view image which is the synthesized data by mapping, into a two-dimensional space which is the virtual space, top-view images each of which is the sensing data obtained from a corresponding one of the plurality of moving bodies arranged in the line; and each of the top-view images is an image of a surrounding area of the moving body corresponding to the top-view image when seen from above the moving body.

8. The data generator according to claim 1,
wherein the circuitry:
displays an image represented by the synthesized data onto a display.

9. A data generating method, comprising:
obtaining sensing data from each of a plurality of moving bodies that includes a plurality of sensors, the sensing data being configured based on results of sensing by the plurality of sensors; and
generating synthesized data by mapping the sensing data of the moving body into a virtual space,
wherein in the generating of the synthesized data, a position of the sensing data to be mapped into the virtual space is determined based at least on a position of the moving body in a real space corresponding to the sensing data, and
wherein the data generating method further comprises:
obtaining, from each of the plurality of moving bodies, position information at a time when the sensing data of the moving body is generated, the position information indicating the position of the moving body in the real space; and
when generating the synthesized data, determining the position of the sensing data in the virtual space obtained from the moving body, based on the position indicated by the position information of the moving body.

10. A data generator, comprising:
circuitry; and
memory connected to the circuitry,
wherein the circuitry, in operation:
obtains sensing data from each of a plurality of moving bodies that includes a plurality of sensors, the sensing data being configured based on results of sensing by the plurality of sensors; and
generates synthesized data by mapping the sensing data of the moving body into a virtual space,
wherein when generating the synthesized data, the circuitry determines a position of the sensing data to be mapped into the virtual space, based at least on a position of the moving body in a real space corresponding to the sensing data, and
wherein the circuitry further:
obtains, from each of the plurality of moving bodies, direction information at a time when the sensing data of the moving body is generated, the direction information indicating a traveling direction of the moving body; and
when generating the synthesized data, determines a direction of the sensing data in the virtual space obtained from the moving body, based on the traveling direction indicated by the direction information of the moving body.

11. A data generator, comprising:
circuitry; and
memory connected to the circuitry, wherein the circuitry, in operation:
obtains sensing data from each of a plurality of moving bodies that includes a plurality of sensors, the sensing data being configured based on results of sensing by the plurality of sensors; and
generates synthesized data by mapping the sensing data of the moving body into a virtual space,
wherein when generating the synthesized data, the circuitry determines a position of the sensing data to be mapped into the virtual space, based at least on a position of the moving body in a real space corresponding to the sensing data, and
wherein the circuitry:
when obtaining the sensing data, cyclically obtains, from each of the plurality of moving bodies, the sensing data and time information indicating a time at which the sensing data is generated; and
when generating the synthesized data, (i) selects, from the sensing data obtained cyclically from the moving body, particular sensing data generated at a time in a predetermined period, and (ii) maps the particular sensing data selected into the virtual space, the time in the predetermined period being indicated by the time information corresponding to the sensing data.

* * * * *